United States Patent
Harrison et al.

(10) Patent No.: US 12,459,815 B2
(45) Date of Patent: *Nov. 4, 2025

(54) OXIDATIVE REFORMING AND ELECTROLYSIS SYSTEM AND PROCESS FOR HYDROGEN GENERATION

(71) Applicant: PCC HYDROGEN INC., Louisville, KY (US)

(72) Inventors: Jeffrey Baker Harrison, Louisville, KY (US); Timothy Griffith Fogarty, Prospect, KY (US); Devendra Pakhare, Louisville, KY (US); Timothy David Appleberry, Louisville, KY (US); Joshua Aaron Gubitz, Louisville, KY (US)

(73) Assignee: PCC HYDROGEN INC., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/975,691

(22) Filed: Dec. 10, 2024

(65) Prior Publication Data
US 2025/0100877 A1 Mar. 27, 2025

Related U.S. Application Data

(63) Continuation of application No. 18/317,078, filed on May 13, 2023, now Pat. No. 12,162,757, which is a
(Continued)

(51) Int. Cl.
*C01B 3/40* (2006.01)
*C01B 3/36* (2006.01)
(Continued)

(52) U.S. Cl.
CPC ............ *C01B 3/40* (2013.01); *C01B 3/36* (2013.01); *C01B 3/48* (2013.01); *C25B 1/04* (2013.01);
(Continued)

(58) Field of Classification Search
CPC ..... C01B 2203/0227; C01B 3/40; C01B 3/36; C01B 3/48; C25B 1/04
See application file for complete search history.

(56) References Cited

U.S. PATENT DOCUMENTS

| 4,927,857 A | 5/1990 | McShea et al. |
| 5,070,016 A | 12/1991 | Hallberg |

(Continued)

FOREIGN PATENT DOCUMENTS

| CA | 2695336 A1 | 9/2010 |
| CN | 1748334 A | 3/2006 |

(Continued)

OTHER PUBLICATIONS

Ni, et al. "Energy and exergy analysis of hydrogen production by a proton exchange membrane (PEM) electrolyzer plant." (Year: 2008).*
(Continued)

*Primary Examiner* — Anthony J Zimmer
*Assistant Examiner* — Eric Scott Sherman
(74) *Attorney, Agent, or Firm* — HULTQUIST, PLLC; Steven J. Hultquist

(57) ABSTRACT

A process and system for generating hydrogen gas are described, in which water is electrolyzed to generate hydrogen and oxygen, and a feedstock including oxygenate(s) and/or hydrocarbon(s), is non-autothermally catalytically oxidatively reformed with oxygen to generate hydrogen. The hydrogen generation system in a specific implementation includes an electrolyzer arranged to receive water and to generate hydrogen and oxygen therefrom, and a non-autothermal segmented adiabatic reactor containing non-autothermal oxidative reforming catalyst, arranged to receive the feedstock, water, and electrolyzer-generated oxygen, for non-autothermal catalytic oxidative reforming reaction to produce hydrogen. The hydrogen generation
(Continued)

process and system are particularly advantageous for using bioethanol to produce green hydrogen.

30 Claims, 7 Drawing Sheets

Related U.S. Application Data continuation-in-part of application No. PCT/US2022/079772, filed on Nov. 11, 2022, and a continuation-in-part of application No. 17/727,720, filed on Apr. 23, 2022, now Pat. No. 11,649,549.

(60) Provisional application No. 63/278,164, filed on Nov. 11, 2021.

(51) Int. Cl.
  *C01B 3/48* (2006.01)
  *C25B 1/04* (2021.01)

(52) U.S. Cl.
  CPC ............ *C01B 2203/0227* (2013.01); *C01B 2203/0294* (2013.01); *C01B 2203/1229* (2013.01)

(56) References Cited

U.S. PATENT DOCUMENTS

| | | | |
|---|---|---|---|
| 5,338,488 A | 8/1994 | Choudhary et al. | |
| 6,299,994 B1* | 10/2001 | Towler | B01J 8/0469 423/652 |
| 6,641,625 B1 | 11/2003 | Clawson et al. | |
| 7,641,889 B1 | 1/2010 | Salinas et al. | |
| 9,440,851 B2 | 9/2016 | Hwang | |
| 9,943,818 B2 | 4/2018 | Jin et al. | |
| 11,649,549 B1 | 5/2023 | Harrison et al. | |
| 12,060,269 B1 | 8/2024 | Fogarty et al. | |
| 2002/0177628 A1* | 11/2002 | Gaffney | B01J 23/8986 502/259 |
| 2004/0077494 A1 | 4/2004 | LaBarge et al. | |
| 2005/0260123 A1 | 11/2005 | Deluga et al. | |
| 2006/0013759 A1 | 1/2006 | Jiang et al. | |
| 2006/0014840 A1 | 1/2006 | Schmidt et al. | |
| 2006/0029539 A1 | 2/2006 | Dutta et al. | |
| 2007/0244208 A1 | 10/2007 | Shulenberger et al. | |
| 2008/0060935 A1 | 3/2008 | Hartvingsen | |
| 2010/0109339 A1 | 5/2010 | Quinn | |
| 2010/0150823 A1 | 6/2010 | Huang et al. | |
| 2014/0100294 A1 | 4/2014 | Cohn et al. | |
| 2014/0144397 A1 | 5/2014 | Bromberg, III et al. | |
| 2017/0292446 A1 | 10/2017 | Hwang | |
| 2018/0141028 A1 | 5/2018 | Lin et al. | |
| 2019/0031604 A1 | 1/2019 | Erlandsson et al. | |
| 2020/0109051 A1 | 4/2020 | Petersen-Aasberg et al. | |
| 2020/0140273 A1 | 5/2020 | Petersen-Aasberg et al. | |
| 2020/0172394 A1 | 6/2020 | Han et al. | |
| 2022/0041440 A1 | 2/2022 | Mortensen | |
| 2022/0170388 A1 | 6/2022 | O'Donnell et al. | |
| 2023/0147136 A1 | 5/2023 | Harrison et al. | |
| 2023/0278860 A1 | 9/2023 | Harrison et al. | |

FOREIGN PATENT DOCUMENTS

| | | |
|---|---|---|
| CN | 101407921 B | 11/2010 |
| GB | 2274284 A | 7/1994 |
| WO | 2019228796 A1 | 12/2019 |
| WO | 2020058859 A1 | 3/2020 |
| WO | 2021162799 A1 | 8/2021 |
| WO | 2022115721 A2 | 6/2022 |

OTHER PUBLICATIONS

Bodner, et al. "H2 generation from alkaline electrolyzer." Wiley Interdisciplinary Reviews: Energy and Environment 4.4 (2015): 365-381 (Year: 2015).*
Ni, et al. "Technological development of hydrogen production by solid oxide electrolyzer cell (SOEC)." International journal of hydrogen energy 33.9 (2008): 2337-2354 (Year: 2008).*
Rasten, et al. "Electrocatalysis in water electrolysis with solid polymer electrolyte." Electrochimica acta 48.25-26 (2003): 3945-3952 (Year: 2003).*
"autothermal adjective", Dictionary, Mirriam Webster, Inc., 2024.
"Volatile Organic Compounds in Your Home", Oct. 20, 2022, Minnesota Department of Health.
International Search Report and Written Opinion issued in PCT/US22/79772 on Mar. 6, 2023.

* cited by examiner

OXIDATIVE REFORMING AND ELECTROLYSIS SYSTEM AND PROCESS FOR HYDROGEN GENERATION

CROSS-REFERENCE TO RELATED APPLICATIONS

This is a continuation under 35 USC § 120 of U.S. patent application Ser. No. 18/317,078 filed May 13, 2023 in the names of Jeffrey Baker Harrison, Timothy Griffith Fogarty, Devendra Pakhare, Timothy David Appleberry, and Joshua Aaron Gubitz for OXIDATIVE REFORMING AND ELECTROLYSIS SYSTEM AND PROCESS FOR HYDROGEN GENERATION, which in turn is a continuation-in-part under 35 USC § 120 of U.S. patent application Ser. No. 17/727,720 filed Apr. 23, 2022 in the names of Jeffrey Baker Harrison, Timothy Griffith Fogarty, Devendra Pakhare, Timothy David Appleberry, and Joshua Aaron Gubitz for OXIDATIVE REFORMING AND ELECTROLYSIS SYSTEM AND PROCESS FOR HYDROGEN GENERATION and a continuation-in-part under 35 USC § 120 of International Patent Application PCT/US2022/079772 filed Nov. 11, 2022 in the names of Jeffrey Baker Harrison, Timothy Griffith Fogarty, Devendra Pakhare, Timothy David Appleberry, and Joshua Aaron Gubitz for OXIDATIVE REFORMING AND ELECTROLYSIS SYSTEM AND PROCESS FOR HYDROGEN GENERATION, which in turn claim the benefit under 35 USC § 119 of U.S. Provisional Patent Application 63/278,164 filed Nov. 11, 2021 in the names of Jeffrey Baker Harrison, Timothy Griffith Fogarty, Devendra Pakhare, Timothy David Appleberry, and Joshua Aaron Gubitz for OXIDATIVE REFORMING AND ELECTROLYSIS SYSTEM AND PROCESS FOR HYDROGEN GENERATION. The disclosures of all such applications are hereby incorporated herein by reference, in their respective entireties, for all purposes.

FIELD OF THE DISCLOSURE

The present disclosure relates to generation of hydrogen, and more specifically to an integrated oxidative reforming and electrolysis system and process producing hydrogen in an efficient, cost-effective manner. The system and process of the present disclosure can utilize a variety of feedstocks, and is particularly advantageous in applications utilizing renewable energy and renewable feedstock materials. The integrated oxidative reforming and electrolysis system and process may also be further integrated with (i) an ethanol refinery and/or (ii) a $CO_2$ processing or carbon capture plant, in various specific implementations and embodiments.

BACKGROUND AND DESCRIPTION OF THE RELATED ART

Approximately 75 million metric tons/year of pure hydrogen are produced globally. This hydrogen finds use in petroleum refining, steel production, food processing, and industrial manufacture of ammonia, methanol, and other chemical products.

In recent years, increasing efforts and resources have been directed to achieving efficient, cost-effective, and renewable generation of hydrogen, thereby accelerating its acceptance and use as an energy source. Hydrogen is attractive for use in fuel cells to produce electricity in a very efficient and environmentally advantageous manner, with the only byproduct being water. It is anticipated that hydrogen will be increasingly used as an energy carrier to produce electricity for mobile and small to medium scale stationary applications using fuel cells. This development will correspondingly stimulate the development of technologies for utilizing hydrogen as a clean fuel for vehicular and transport power systems.

A fundamental issue associated with current hydrogen generation relates to the fact that the vast majority of hydrogen is currently produced by steam methane reforming ("SMR"). The hydrogen product of SMR is referred to as gray hydrogen, since SMR is a highly energy intensive process due to the correspondingly high endothermic character of the reforming reaction, and releases substantial amounts of greenhouse gases into the environment. In consequence of such deficiencies, increasing attention and investment is being directed to the development of green hydrogen, namely, hydrogen produced using renewable energy sources. In the United States, substantial efforts are focused on achieving green hydrogen production at a cost of $1 USD/kilogram $H_2$ by 2030.

Steam reforming of hydrocarbons other than methane can be performed, but the associated reaction chemistry requires specialized equipment, metallurgy, and catalysts, as well as considerable added heat. As a result, the high capital and operating costs make such steam reforming processes uneconomical for small-scale hydrogen generation.

Electrolysis of water is a process for hydrogen production, but less than 0.1% of global dedicated hydrogen production is derived from water electrolysis, as a result of its high cost and high energy requirements, since water hydrolysis requires considerable electricity in order to dissociate water to yield hydrogen and oxygen. Although the thermal efficiencies of commercial electrolyzers are in the range of 60%-70%, when power line losses and other electricity conversion losses are taken into account, overall energy efficiency of water electrolysis is in the range of only about 25-40%. Energy requirements of current electrolysis systems are in a range of 53.4-70.1 kWh/kilogram of hydrogen produced, and the cost of electricity for the energy-intensive water electrolysis process therefore is a significant factor in the high production cost of hydrogen generated by such systems. This is true whether non-renewable or renewable electricity is utilized. Faced with the foregoing problems, the art continues to seek new approaches for generating hydrogen in an economic, efficient, and environmentally benign manner.

SUMMARY

The present disclosure relates to systems and processes for hydrogen generation.

In one aspect, the disclosure relates to a hydrogen generation process, comprising: electrolyzing water to generate hydrogen and oxygen; and catalytically oxidatively reforming a hydrocarbon feedstock with such oxygen to generate additional hydrogen.

In another aspect, the disclosure relates to a hydrogen generation system, comprising: an electrolyzer arranged to receive water and to generate hydrogen and oxygen therefrom; and a reactor containing oxidative reforming catalyst, arranged to receive a hydrocarbon feedstock, water, and electrolyzer-generated oxygen, for catalytic oxidative reforming reaction of the hydrocarbon feedstock, water, and oxygen to produce hydrogen.

The disclosure in a further aspect relates to a coupled hydrogen generation system, comprising a water electrolyzer, and a catalytic oxidative reforming reactor arranged to receive oxygen from the water electrolyzer.

Another aspect of the disclosure relates to a hydrogen generation process, comprising: (i) electrolyzing water to generate hydrogen and oxygen, and (ii) utilizing the oxygen from the electrolyzing to conduct an oxidative reforming reaction.

A further aspect of the disclosure relates to a hydrogen production process, comprising: (a) electrolyzing water to generate hydrogen gas and oxygen gas therefrom, the generated hydrogen gas being a first hydrogen component of the hydrogen production; (b) adiabatically and non-autothermally catalytically oxidatively reforming a feedstock comprising at least one of an oxygenate and a hydrocarbon, with water and with high purity oxygen comprising at least a portion of the oxygen gas generated by the electrolyzing, to produce oxidative reforming reaction product gas containing hydrogen, CO, $CO_2$, methane, and steam; (c) catalytically reacting the oxidative reforming reaction product gas in a catalytic water gas shift reaction to convert at least part of the CO in the oxidative reforming reaction product gas to $CO_2$ and hydrogen by reaction with the steam therein, to produce a water gas shift reaction product gas containing hydrogen, methane, CO, and $CO_2$; and (d) separating the water gas shift reaction product gas to recover hydrogen gas therefrom as a second hydrogen component of the hydrogen production.

In another aspect, the disclosure relates to a hydrogen generation process, comprising: electrolyzing water to generate hydrogen and oxygen; and non-autothermally catalytically oxidatively reforming a feedstock fuel with said oxygen and with water to generate hydrogen, wherein the feedstock fuel comprises fuel selected from the group consisting of oxygenates, hydrocarbons, and mixtures thereof, wherein the feedstock fuel may comprise bio-derived and/or non-bio-derived constituents, and may for example have a bio-derived content of up to 100% by volume, based on total volume of the feedstock fuel, e.g., in a range of from 5% to 100% by volume, based on total volume of the feedstock fuel, and wherein the reforming is conducted in a unitary adiabatic reactor to which the hydrocarbon feedstock fuel, oxygen, and water are introduced, and from which the generated hydrogen is discharged, the unitary adiabatic reactor containing successive catalyst beds contacted in sequence in flow through the reactor, including (i) a first catalyst bed comprising a partial oxidation catalyst, (ii) a second catalyst bed comprising steam reforming catalyst, (iii) a third catalyst bed comprising a high temperature water gas shift catalyst, and optionally (iv) a fourth catalyst bed comprising a low temperature water gas shift catalyst.

Such hydrogen generation process may be carried out in another aspect, wherein the optional fourth catalyst bed is not present in the unitary adiabatic reactor, but is present in a low temperature water gas shift reactor external to the unitary adiabatic reactor.

A further aspect of the disclosure relates to a hydrogen generation system, comprising: an electrolyzer arranged to receive water and to generate hydrogen and oxygen therefrom; and a non-autothermal oxidative reforming system comprising a unitary adiabatic reactor arranged to receive oxygen from the electrolyzer, feedstock fuel from a feedstock fuel source, and water from a water source, the reactor containing successive catalyst beds that are contacted in sequence in flow through the reactor, including (i) a first catalyst bed comprising a partial oxidation catalyst, (ii) a second catalyst bed comprising a steam reforming catalyst, (iii) a third catalyst bed comprising a high temperature water gas shift catalyst, and (iv) a fourth catalyst bed comprising a low temperature water gas shift catalyst, so that feedstock fuel from the feedstock fuel source with the oxygen from the electrolyzer and water is catalytically oxidatively reformed in the reactor to generate hydrogen, the reactor being arranged to discharge the generated hydrogen, wherein the feedstock fuel source is arranged to supply feedstock fuel comprising fuel selected from the group consisting of oxygenates, hydrocarbons, and mixtures thereof, wherein the feedstock fuel may comprise bio-derived and/or non-bio-derived constituents, and may for example have a bio-derived content of up to 100% by volume, based on total volume of the feedstock fuel, e.g., in a range of from 5% to 100% by volume, based on total volume of the feedstock fuel.

Such hydrogen generation system in another aspect may be constituted in an arrangement in which the optional fourth catalyst bed is not present in the unitary adiabatic reactor, and is present in a low temperature water gas shift reactor external to the unitary adiabatic reactor in the hydrogen generation system.

The disclosure in another aspect relates to a thermally integrated hydrogen generation system, comprising: (A) an electrolyzer arranged to receive water and to generate hydrogen gas and oxygen gas therefrom; (B) an oxygen storage vessel, arranged to receive the oxygen gas from the electrolyzer; (C) a non-autothermal oxidative reforming system comprising a unitary adiabatic reactor arranged to receive oxygen gas from the oxygen storage vessel, feedstock fuel from a feedstock fuel source containing the feedstock fuel, and water from a water source, the unitary adiabatic reactor containing successive catalyst beds that are contacted in sequence in flow through the unitary adiabatic reactor, including (i) a first catalyst bed comprising a partial oxidation catalyst. (ii) a second catalyst bed comprising steam reforming catalyst, and (iii) a third catalyst bed comprising a high temperature water gas shift catalyst, so that the feedstock fuel from the feedstock fuel source with the oxygen from the oxygen storage vessel and the water from the water source is catalytically oxidatively reformed in the unitary adiabatic reactor to generate oxidatively reformed gas that is predominantly hydrogen, the unitary adiabatic reactor being arranged to discharge the generated oxidatively reformed gas, (D) a first heat exchanger arranged to receive the generated oxidatively reformed gas from the unitary adiabatic reactor and remove heat therefrom, to produce a reduced temperature oxidatively reformed gas; (E) a low temperature water gas shift reactor arranged to receive the reduced temperature oxidatively reformed gas from the first heat exchanger and convert at least a portion of carbon monoxide in the reduced temperature oxidatively reformed gas to carbon dioxide, to produce a low temperature water gas shift reaction gas of reduced carbon monoxide content, the low temperature water gas shift reactor including a fourth catalyst bed comprising a low temperature water gas shift catalyst; (F) a hydrogen gas purifier arranged to receive the low temperature water gas shift reaction gas of reduced carbon monoxide content from the low temperature water gas shift reactor, and to produce a separated hydrogen gas, and waste gas containing CO, $CO_2$, methane, and unrecovered (residual) hydrogen; (G) a hydrogen gas reservoir, arranged to receive the hydrogen gas from the electrolyzer and the separated hydrogen gas from the hydrogen gas purifier; (H) a burner arranged to combust the waste gas produced by the hydrogen gas purifier, containing CO, $CO_2$, methane, and unrecovered (residual) hydrogen, to yield a flue gas; (I) a second heat exchanger arranged to receive the flue gas from the burner for heating of the oxygen gas from the oxygen storage vessel, the feedstock fuel from the feedstock fuel source, and the water from the water source prior to their introduction to the unitary adiabatic reactor; and (J) a process controller configured and arranged to coordinate operation of the electrolyzer and the non-autothermal oxidative reforming system in the thermally integrated hydrogen generation system, and adjust throughput of each of the electrolyzer and the non-autothermal oxidative reforming system to control temperature in the unitary adiabatic reactor, wherein the feedstock fuel contained in the feedstock fuel source comprises fuel selected from the group consisting of oxygenates, hydrocarbons, and mixtures thereof, the feedstock fuel being of any suitable type, including bio-derived and/or non-bio-derived constituents, and in various specific implementations employing a feedstock fuel having a bio-derived content of up to 100% by volume, based on total volume of the feedstock fuel, e.g., in a range of from 5% to 100% by volume, based on total volume of the feedstock fuel.

A further aspect of the disclosure relates to a hydrogen generation process, comprising operating the thermally integrated hydrogen generation system described immediately above to perform a hydrogen generation process comprising: electrolyzing water to generate hydrogen gas and oxygen gas therefrom; and non-autothermally catalytically oxidatively reforming the feedstock fuel with the oxygen gas and with water from the water source to generate hydrogen.

Other aspects, features and embodiments of the disclosure will be more fully apparent from the ensuing description and appended claims.

DETAILED DESCRIPTION

Figure 1A:
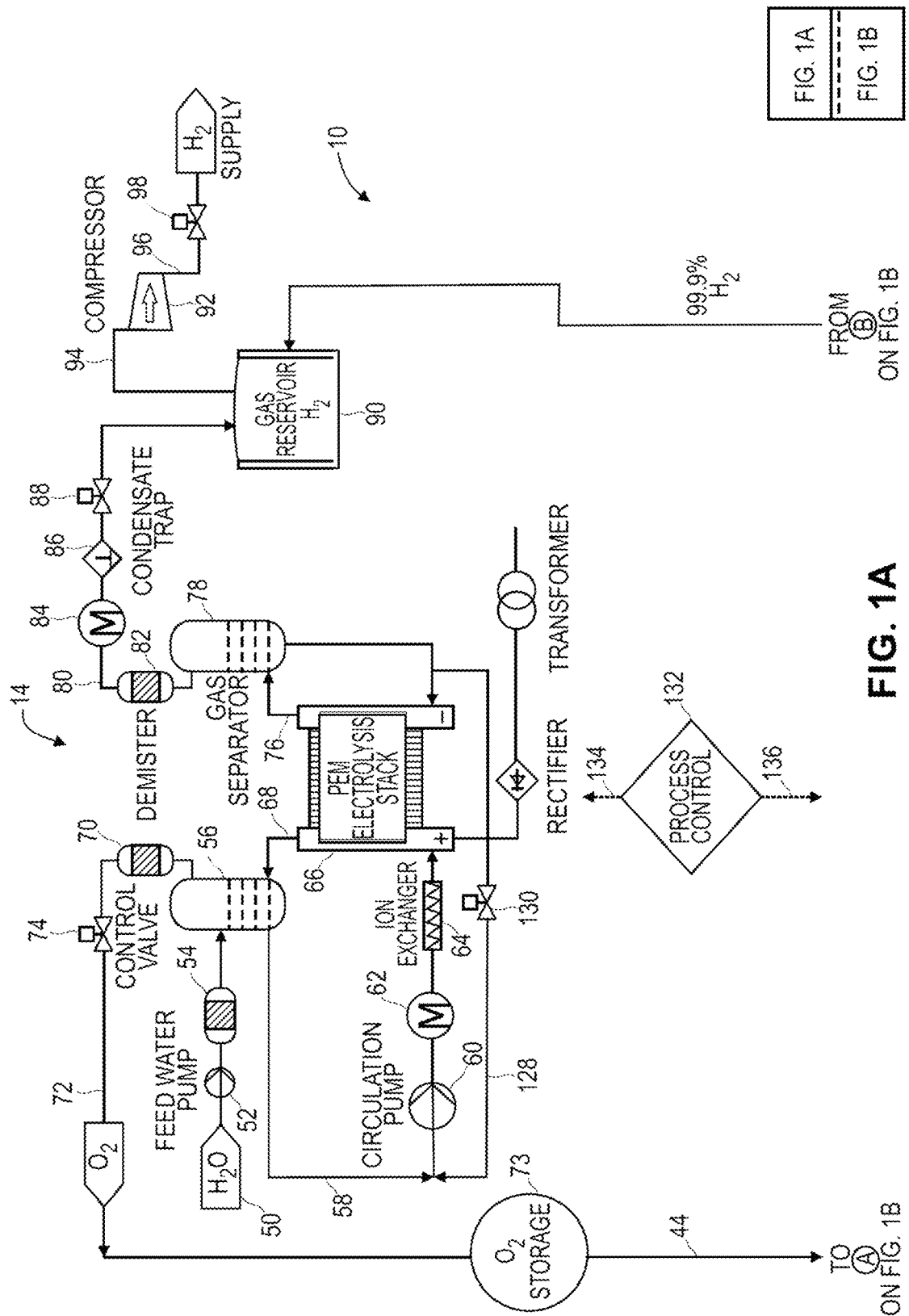
FIG. 1A and 1B show a schematic flow sheet of a hydrogen generation system according to one embodiment of the present disclosure, integrating an oxidative reforming process system with a low temperature electrolysis system

The present disclosure relates to systems and processes for producing hydrogen in a cost-effective, efficient, and environmentally advantageous manner.

As used herein and in the appended claims, the singular forms "a", "and", and "the" include plural referents unless the context clearly dictates otherwise.

As used herein and in the appended claims, the term "about" in reference to a numeric value means a range of corresponding values that may vary by ±10% in relation to the numeric value.

As used herein and in the appended claims, the terms "biologically produced" and "bio-derived" in reference to a feedstock fuel exclude fossil fuel hydrocarbon feedstocks and fossil fuel hydrocarbon feedstock components.

As used herein and in the appended claims, the term "high purity oxygen" refers to gas containing at least 98 mol % oxygen ($O_2$) and the term "high purity hydrogen" refers to gas containing at least 98 mol % hydrogen.

As used herein and in the appended claims, the term "predominantly" in reference to component(s) of a gas means that such component(s) constitute greater than 50 mol % of the gas.

As used herein and in the appended claims, the term "oxygenates" means chemical compounds containing oxygen as part of their chemical structure, which can be non-autothermally oxidatively reformed to produce hydrogen. Non-limiting examples of oxygenates include alcohols, e.g., methanol, ethanol, isopropyl alcohol, n-butanol, and tert-butanol, and ethers, e.g., methyl tert-butyl ether, tert-amyl methyl ether, tert-hexyl methyl ether, ethyl tert-butyl ether, tert-amyl ethyl ether, diisopropyl ether, glycols e.g. ethylene glycol, propylene glycol, butane diol, aldehydes e.g. fomaldehyde, acetaldehyde, and acids e.g. formic acid, acetic acid, lactic acid, and citric acid.

In all chemical formulae herein, a range of carbon numbers will be regarded as specifying a sequence of consecutive alternative carbon-containing moieties, including all moieties containing numbers of carbon atoms intermediate the endpoint values of carbon number in the specific range as well as moieties containing numbers of carbon atoms equal to an endpoint value of the specific range, e.g., $C_1$-$C_6$, is inclusive of $C_1$, $C_2$, $C_3$, $C_4$, $C_5$ and $C_6$, and each of such broader ranges may be further limitingly specified with reference to carbon numbers within such ranges, as sub-ranges thereof, within the scope of the present disclosure. Thus, for example, the range $C_1$-$C_6$ would be inclusive of and can be further limited by specification of sub-ranges such as $C_1$-$C_3$, $C_1$-$C_4$, $C_2$-$C_6$, $C_4$-$C_6$, etc. within the scope of the broader range. In addition, ranges of carbon numbers herein may be further specified within the scope of the disclosure to particularly exclude a carbon number or carbon numbers from such ranges of carbon numbers, and sub-ranges excluding either or both of carbon number limits of specified ranges are also included in the scope of the disclosure.

The same construction and selection flexibility is applicable to stoichiometric coefficients and numerical values specifying the number of atoms, functional groups, ions or moieties, as to specified ranges and numerical value constraints (e.g., inequalities, including "greater than" (>) or "less than" (<) constraints), as well as to oxidation states and other variables determinative of the specific form, charge state, and composition of chemical compounds, chemical species, and chemical entities, within the broad scope of the present disclosure.

As used herein and in the appended claims, the term "autothermal reforming" means a conversion process that is conducted with partial combustion of a feedstock fuel in the presence of oxidant, using a burner for combustion, prior to contacting with oxidation catalyst, and the term "non-autothermal oxidative reforming" means oxidative reforming that is conducted without such combustion, and in which the conversion process is fully catalytic.

The disclosure, as variously set out herein in respect of features, aspects and embodiments thereof, may in particular implementations be constituted as comprising, consisting, or consisting essentially of, some or all of such features, aspects and embodiments, as well as elements and components thereof being aggregated to constitute various further implementations of the disclosure. The disclosure is set out herein in various embodiments, and with reference to various features and aspects of the disclosure. The disclosure contemplates such features, aspects and embodiments in various permutations and combinations, as being within the scope of the invention. The disclosure may therefore be specified as comprising, consisting or consisting essentially of, any of such combinations and permutations of these specific features, aspects and embodiments, or a selected one or ones thereof.

The present disclosure provides a hydrogen generation system and process that avoids and/or overcomes the various problems discussed in the Background and the Description of the Related Art section herein as present in prior conventional approaches to hydrogen generation. The hydrogen generation system and process of the present disclosure integrates water electrolysis with non-autothermal oxidative reforming, wherein oxygen generated as a byproduct of the water electrolysis reaction is advantageously used in the non-autothermal oxidative reforming ("OR") reaction.

The oxidative reforming that is carried out in the integrated electrolysis and oxidative reforming system of the present disclosure is non-autothermal oxidative reforming, and such non-autothermal oxidative reforming advantageously is carried out in an adiabatic reactor system so that no external heat other than preheating of reactants is required to sustain the conversion process.

A fundamental goal of the present disclosure is the integrated combination of an electrolysis system with a non-autothermal oxidative reforming system to convert oxygenates and/or mixtures of oxygenates and hydrocarbons to produce predominantly hydrogen. In this integrated system, the primary source of oxygen is the electrolysis system, but the oxygen requirements of the integrated system may be supplemented by additional high purity oxygen sources and supplies, including, without limitation, cryogenic air separation plants, adsorbent-based air separation systems such as pressure swing adsorption (PSA) plants, temperature swing adsorption (TSA) plants, pressure swing adsorption/temperature swing adsorption (PSA/TSA) plants, high purity oxygen pipelines, tanks, tube trailers, and other systems, equipment, and reservoirs that are effective to deliver high purity oxygen for use in the integrated electrolysis and non-autothermal oxidative reforming system.

Non-autothermal oxidative reforming in the hydrogen generation system and process of the present disclosure may be carried out with any suitable type or types of feedstock fuel, including non-bio-derived feedstock fuels and/or bio-derived feedstock fuels, such as feedstock fuels in which the bio-derived content of the feedstock fuel is up to 100% by volume based on the total volume of the feedstock fuel e.g., feedstock fuels containing bio-derived content in a range of from 5% to 100% by volume, based on the total volume of the feedstock fuel.

The feedstock fuel utilized in the integrated electrolysis and oxidative reforming system of the present disclosure thus can be bio-derived and/or non-bio-derived, and may comprise oxygenates, landfill gas, hydrocarbons, and combinations of the foregoing. Non-bio-derived feedstock fuels may for example comprise natural gas, $C_2$-$C_{15}$ hydrocarbons, methanol, or blends of alcohols and/or hydrocarbons. Fossil fuel hydrocarbons can be used in combination with bio-derived fuels, but it is a salient feature of various preferred embodiments of the hydrogen production technology of the present disclosure that the bio-derived content of the feedstock fuel is present at a concentration of up to 100% by volume, based on total volume of the feedstock fuel, e.g., in a range of from 1% to 100% by volume, 5% to 100% by volume, or other suitable range or value of bio-derived content, based on total volume of the feedstock fuel.

In various embodiments, the bio-derived content of the feedstock fuel may be in a range in which the lower end point value is 1%, 2%, 3%, 4%, 5%, 8%, 10%, 12%, 15%, 18%, 20%, 25%, 30%, 35%, 40%, 45%, 50%, 55%, 60%, 65%, 70%, 75%, 80%, 85%, 90%, 95%, 98%, or up to 100%, and in which the upper end point value is one of the foregoing numeric values exceeding the lower end point value.

The feedstock fuel may for example comprise gaseous and/or liquid hydrocarbons in the range of methane to diesel, especially those that can be produced biologically, but the disclosure is not limited thereto. As used in this context, diesel refers to hydrocarbon compositions constituted mainly of paraffins, aromatics and naphthenes, and contains hydrocarbons with approximately 12 to 20 carbon atoms, with the compositions having a boiling range from about 170° C. to about 360° C. When diesel compositions are employed, the diesel composition may comprise biodiesel, or alternatively or additionally may comprise petroleum-derived diesel. Other hydrocarbon compositions may be employed, including single component hydrocarbon compositions as well as multicomponent hydrocarbon compositions, of widely varying types.

Thus, the present disclosure encompasses the use of non-bio-derived feedstock fuels in the integrated electrolysis and oxidative reforming system of the present disclosure, such as for example natural gas, $C_2$-$C_{15}$ hydrocarbons, methanol, and alcohol/hydrocarbon blends, in embodiments in which the feedstock fuels contain no or substantially no bio-derived feedstock fuel components, as well as encompassing other embodiments in which the non-bio-derived feedstock fuel component(s) is/are in mixture with bio-derived feedstock fuel component(s), as well as encompassing still other embodiments in which the feedstock fuels contain no or substantially no non-bio-derived feedstock fuels.

It correspondingly is a highly beneficial aspect of the integrated electrolysis and oxidative reforming system and process of the present disclosure, that such system and process are able to operate on a wide variety of feedstock fuels, and that the feedstock fuel mix that is utilized may be varied depending on availability and cost of specific candidate feedstock fuels. For example, bioethanol may be used as the feedstock fuel during a period of low cost and ready availability of bioethanol in relation to other candidate feedstock fuels, and the feedstock fuel may be changed to another feedstock fuel, e.g., natural gas, when bioethanol is not available or is relatively more costly as compared to natural gas, or blends of various feedstock fuels may be utilized in which the relative proportions of various available feedstock fuel components are varied in relation to one another depending on cost and availability, to achieve economical and efficient operation of the integrated electrolysis and oxidative reforming system and process.

In various embodiments of the oxidative reforming operation in the integrated hydrogen generation systems and processes of the present disclosure, the non-autothermal oxidative reforming (OR) feedstock fuel may include biological and fossil fuel-derived feedstocks, such as methane, methanol, ethanol, propanol, butanol, glycerol, ethylene glycol, diesel, or blends of two or more of the foregoing, but the disclosure is not limited thereto. It will be recognized that inorganic compounds and materials may be present in the feedstock, such as for example phosphates and sulfur compounds, in various implementations of the non-autothermal OR operation. The non-autothermal OR feedstocks preferably are predominantly constituted by biological feedstocks, e.g., biomethane, biomethanol, etc. Any suitable biofuels can be employed in the non-autothermal OR feedstock.

In various preferred embodiments of the non-autothermal oxidative reforming operation in the integrated hydrogen generation systems and processes of the present disclosure, the non-autothermal OR feedstock is constituted by, or includes, alcohols. Among alcohols, ethanol is particularly advantageous, and may be renewable ethanol that is produced from corn, sugar cane, sugar beets, or other biomass without contributing to greenhouse gas emissions. Ethanol is abundantly available, since it is widely produced and supplied as an additive to gasoline. Anticipated future declines in gasoline powered vehicles on roadways will result in ethanol production being increasingly allocated to other applications, a circumstance that favors the implementation and use of the hydrogen generation systems and processes of the present disclosure.

The integrated non-autothermal oxidative reforming and water electrolysis operations carried out in the systems and processes of the present disclosure enable the production of low-cost green hydrogen that can be utilized, for example, in fuel cells to produce electricity very efficiently and cleanly, with only water as a byproduct.

The integrated non-autothermal oxidative reforming and water electrolysis systems and processes of the present disclosure may also be employed in various embodiments to produce syngas (mixtures including hydrogen ($H_2$) and carbon monoxide (CO) as predominant components) as a product gas, wherein $CO_2$ may be partially substituted for $H_2O$ in the oxidant/reforming feed gas. Specifically, $H_2O/CO_2$ ratio may be in a range of from 0 to 20 (pure $CO_2$ to pure $H_2O$), e.g.,

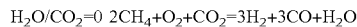

$H_2O/CO_2=0\ 2CH_4+O_2+CO_2=3H_2+3CO+H_2O$

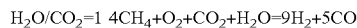

$H_2O/CO_2=1\ 4CH_4+O_2+CO_2+H_2O=9H_2+5CO$ and the product gas may include syngas (CO, $H_2$, $CO_2$) wherein ($H_2$ vol %–$CO_2$ vol %)/(CO vol %+$CO_2$ vol %)≥1.0.

While the integrated non-autothermal oxidative reforming and water electrolysis operations of the present disclosure are hereinafter illustratively described with reference to ethanol ($C_2H_5OH$) as the non-autothermal oxidative reforming (OR) feedstock, it will be appreciated that the present disclosure is not limited thereto, and that corresponding implementations of the integrated non-autothermal oxygen reforming and water electrolysis systems and processes of the present disclosure can be carried out with any other suitable non-autothermal OR feedstocks, including those disclosed by way of example hereinabove, as well as others, including a wide variety of other hydrocarbon and hydrocarbyl feedstocks, in specific embodiments, implementations, and applications of the present disclosure.

In the integrated non-autothermal oxidative reforming and water electrolysis operation of the present disclosure, the non-autothermal oxidative reforming may be carried out in the presence of suitable catalyst at temperature that may for example be in a range of from about 600° C. to about 1000° C., or in other suitable range of temperature. In this operation, $C_2H_5OH$ is introduced into a non-autothermal reformer or reactor, where the liquid is thermochemically reduced into shorter-chained carbonaceous species. These carbonaceous compounds react with steam in the presence of catalyst to produce a mixture of $H_2$ and other compounds, such as for example carbon monoxide (CO), carbon dioxide ($CO_2$), acetaldehyde ($C_2H_4O$), ethane ($C_2H_5$), ethylene ($C_2H_4$), and acetone ($CH_3COCH_3$).

The catalyst used in the non-autothermal OR process may be of any suitable type, and may for example comprise noble metal catalyst, mixed metal oxide catalyst, perovskite catalyst, hexaaluminate catalyst, pyrochlore catalyst, or any other useful oxidative reforming catalyst. Non-autothermal OR catalysts useful in specific applications of the systems and processes of the present disclosure include, in various embodiments, catalysts comprising metals such as aluminum, zirconium, nickel, magnesium, gadolinium, yttrium, cobalt, cerium, ruthenium, noble metals, etc. In various embodiments, catalysts such as the mixed metal oxide catalysts described in U.S. Pat. No. 10,688,472 may be employed. In various other specific embodiments, the catalyst may be a ruthenium catalyst or a nickel catalyst, supported on a carrier such as alumina. In still other specific embodiments, the catalyst may be a platinum catalyst or a palladium catalyst. Other specific embodiments may utilize a non-autothermal oxidative reforming catalyst including one or more metals selected from Pt, Ni, W, Ru, Au, Pd, Mo, Cu, Sn, Rh, and V. Non-autothermal oxidative reforming catalysts in various additional particular embodiments may include one or more metals selected from Pd, Pt, Cu, Mn, and Rh. Further embodiments for carrying out the non-autothermal oxidative reforming may utilize oxidative reforming catalysts including metal(s) selected from Group VIII of the Periodic Table.

Reforming processes invariably produce carbon monoxide (CO), and the water gas shift ("WGS") reaction is an important step in the reforming process. During the WGS reaction, CO is converted to $CO_2$ and $H_2$ through reaction with steam.

In the non-autothermal oxidative reforming operation of the present disclosure, steam and oxygen are fed together as oxidants to reform the hydrocarbon feedstock into a $H_2$-rich product stream, which may be used for example in fuel cells or other $H_2$-powered apparatus. Non-autothermal oxidative steam reforming (OSR) is a combination of partial oxidation and steam reforming, in which oxygen and steam are fed to the non-autothermal reformer vessel to utilize the heat generated from the exothermic partial oxidation of the hydrocarbon (e.g., ethanol) to promote the endothermic steam reforming reactions. By utilizing the generated oxygen from the water electrolysis reaction in the OSR reaction, the need for an air separation plant to generate oxygen for OSR may be avoided, which is advantageous in many implementations since an air separation plant, whether cryogenic or adsorption-based, is highly capital intensive in character. Nonetheless, in various embodiments of integrated non-autothermal oxidative reforming and electrolysis systems of the present disclosure, air separation plants, or other sources or supplies of oxygen may be utilized to supplement and/or buffer the oxygen needs of the non-autothermal oxidative reforming process.

Direct non-autothermal oxidative reforming of ethanol or other suitable feedstock can be carried out by co-feeding steam and oxygen to the reformer vessel containing oxidative reforming catalyst, and contemporaneously introducing ethanol or other suitable feedstock to the non-autothermal reformer vessel. In the non-autothermal reformer vessel, when ethanol is utilized as the feedstock, reaction (1) is carried out:

$$C_2H_5OH + (3-2x)H_2O + xO_2 \rightarrow (6-2x)H_2 + 2CO_2$$
$$\Delta H_{25°C} \approx 0 \text{ kcal/mole, when } x \approx 0.40 \quad (1).$$

In various embodiments of the disclosure, wherein the feedstock is ethanol, the non-autothermal oxidative reforming operation is carried out, wherein $0<x<1.5$. In various other embodiments, $0.10<x<1.1$; $0.3 \leq x \leq 0.9$; $0.3 \leq x \leq 0.5$; $0.75 \leq x \leq 0.85$; or x may be in other ranges appropriate to the non-autothermal reformer vessel operation in the appertaining hydrogen gas generation system. In various specific embodiments, x may for example be about 0.4, 0.5, 0.65, 0.80, 1.0, or other suitable value that is appropriate for carrying out the non-autothermal oxidative reforming operation.

In various embodiments in which the feedstock is ethanol, the hydrogen production process is carried out, wherein the non-autothermal oxidative reforming operation is conducted at a molar ratio of steam to ethanol in a range of from 0 to 6, and a molar ratio of oxygen to ethanol in a range of from 0.1 to 1.

As further specific examples for other feedstocks utilized in the non-autothermal oxidative reforming operation, the following feedstocks and non-autothermal oxidative reforming reactions may be conducted in the integrated oxidative reforming and electrolysis system and process of the present disclosure:

(A) Natural Gas (Methane)

$$2CH_4 + xO_2 + (4-2x)H_2O = (8-2x)H_2 + 2CO_2,$$ wherein x is in a range of from 0.5 to 2.0, and the non-autothermal oxidative reforming operation is thermally neutral at $x=0.7$;

(B) Methanol $$CH_3OH + xO_2 + (1-2x)H_2O = (3-2x)H_2 + CO_2,$$ wherein x is in a range of from 0.1 to 0.5, and the non-autothermal oxidative reforming operation is thermally neutral at $x=0.15$;

(C) Hydrocarbons $$C_nH_m + xO_2 + (2n-2x)H_2O = (2n-2x+m/2)H_2 + nCO_2,$$
wherein x is in a range of from 0.4 to 14, for values of $n=2-15$;

(D) Glycerol $$C_3H_8O_3 + xO_2 + (3-2x)H_2O = (7-2x)H_2 + 3CO_2,$$ wherein x is in a range of from 0.2 to 1.2.

In this regard, it will be recognized that the stoichiometry of the non-autothermal oxidative reforming reaction will vary with specific feedstocks and feedstock blends. In the generalized situation in which the feedstock may be varied, with ethanol or hydrocarbon(s) other than ethanol being present, or when ethanol is present in a hydrocarbon multicomponent feedstock, the non-autothermal oxidative reforming reaction of the hydrocarbon feedstock with oxygen and steam may be carried out, with oxygen being present in a range of from 5 volume % to 95 volume %, based on the total volume of oxygen and steam in the non-autothermal oxidative reforming reaction.

The hydrogen generation operation in accordance with the present disclosure may be carried out in a coupled reactor system in which a water electrolysis reactor is coupled with a non-autothermal oxidative reforming reactor, with byproduct oxygen from the electrolysis reactor being employed in the non-autothermal oxidative reforming reactor to achieve optimal hydrogen generation. The coupled reactor may be advantageously designed for flexible operation, to allow for adjustment in the throughput of the electrolysis reactor and the non-autothermal oxidative reforming reactor, in order to take advantage of variability in feedstock and electricity costs to provide the lowest-cost hydrogen possible, thereby alleviating reliance on low renewable electricity prices.

Considering again reaction (1) above, in the operation of the coupled reactor system in which $x=0.40$, no external sources of heat are required to drive the reaction and it is correspondingly thermally neutral. As such, no excess heat is generated that must be removed and exhausted into the atmosphere or other heat removal systems or subsystems. In consequence, ethanol is not consumed for heating purposes, thereby rendering more of the ethanol feedstock available for conversion to hydrogen.

At values of $x>0.40$, the non-autothermal oxidative reforming becomes exothermic with the generation of additional heat that is potentially available for export to other processes or end-use facilities. While values of x greater than 0.40 decrease hydrogen production, when the non-autothermal oxidative reactor is integrated with other processes requiring heat, the combination enables higher total thermal efficiencies and lower capital and operating costs to be realized.

The integration of a water electrolyzer with the non-autothermal oxidative reforming operation in the hydrogen generation systems and processes of the present disclosure enables electricity to be effectively utilized to split water into separate respective streams of hydrogen and oxygen. The electrolysis reaction is endothermic requiring the input of power to split the water molecules, which occurs by the following reaction (2):

$$2H_2O \rightarrow 2H_2 + O_2 \quad \Delta H_{25°C} \approx 67 \text{ kcal/mol} \quad (2)$$

The electrolyzer that is utilized in the hydrogen generation systems and processes of the present disclosure may be of any suitable type that is appropriate for splitting water molecules into separate streams of hydrogen and oxygen. Such electrolyzer can range in size from small, appliance-sized equipment that is well-suited for small-scale distributed hydrogen production, to large-scale central production facilities that can be connected directly to renewable or other forms of low-cost electricity production. Low temperature alkaline electrolyzers or polymer electrolyte membrane (PEM) electrolyzers may be employed in various embodiments of the hydrogen generation system. In other embodiments of the hydrogen generation system, high temperature solid oxide electrolyzers exhibiting high efficiency with respect to power consumption may be utilized.

Electrolyzers useful in the practice of the present disclosure may thus be of varying types, and may for example include: polymer electrolyte membrane (PEM) electrolyzers such as those commercially available from Plug Power Inc., Latham, New York; alkaline electrolyzers such as those commercially available from Nel ASA, Oslo, Norway; and solid oxide electrolyzers such as those commercially available from Elcogen AS, Tallinn, Estonia.

Regardless of electrolyzer type, the respective hydrogen gas and oxygen gas products discharged from the electrolyzer will contain some level of water vapor therein, and such discharged hydrogen gas and oxygen gas may be dried or dehumidified, if and to the extent required, by use of suitable de-misters, dehumidifiers, condensers, etc.

In various embodiments of the integrated electrolysis and oxidative reforming system of the present disclosure, the electrolyzer is configured, constructed, arranged, and operated to produce from 15% to 60% of the total hydrogen produced by the integrated electrolysis and oxidative reforming system, and to provide the full amount of oxygen required for the oxidative reforming while minimizing the power requirement of the electrolyzer in the integrated electrolysis and oxidative reforming system. In other embodiments, the electrolyzer is configured, constructed, arranged, and operated to produce from 25% to 50% of the total hydrogen produced by the integrated electrolysis and oxidative reforming system. In still other embodiments, the electrolyzer is configured, constructed, arranged, and operated to produce from 35% to 45% of the total hydrogen produced by the integrated electrolysis and oxidative reforming system. Such operations of the electrolyzer may additionally in various embodiments concurrently provide all oxygen requirements for burning of tail gas (the unrecovered (residual) hydrogen-, methane-, CO-, and $CO_2$-containing gas resulting from separation of water gas shift reaction product gas to recover hydrogen gas) to provide for heating of reactants (feedstock, water, and high purity oxygen) introduced to the oxidative reforming operation. The combustion of the unrecovered (residual) hydrogen-, methane-, CO-, and $CO_2$-containing tail gas, resulting from the separation of the water gas shift reaction product gas that is carried out to recover hydrogen gas, is highly advantageous for providing heating of the reactants introduced to the adiabatic reactor, and/or other heating requirements of the integrated electrolysis and oxidative reforming system. The tail gas in various embodiments may additionally comprise ethylene, as a constituent that may provide additional heating value in the tail gas combustion operation. In some embodiments, heat generated by the combustion of the tail gas may additionally be exported from the integrated electrolysis and oxidative reforming system. It may also be provided in the integrated electrolysis and oxidative reforming system by heat from other sources such as solar heating arrays, geothermal sources, etc., in the broad practice of the systems of the present disclosure.

When the feedstock being processed in the catalytic reforming operation in the integrated electrolysis and oxidative reforming system is an ethanol feedstock, such feedstock may derive from an ethanol refinery, and may for example comprise an ethanol distillate from a distilling operation in the ethanol refinery, and/or may comprise ethanol from a fermentation operation in the ethanol refinery without any subsequent distillation or subsequent processing. The ethanol feedstock may correspondingly contain varying levels of water therein depending on the particulars of the ethanol refinery processes from which the feedstock derives, e.g., water content of up to 10%, or even higher, by weight, based on total weight of the ethanol feedstock. The ethanol feedstock in various embodiments may be hydrated or alternatively may be anhydrous in character. Ethanol feedstock containing water provides ethanol as well as water reactant to the catalytic reforming operation. It will therefore be appreciated that the integrated electrolysis and oxidative refining process and system of the disclosure can accommodate ethanol refinery feedstocks of varying character, which in addition to water content may comprise other components deriving from fermentation operations or other processes in the ethanol refinery, depending on the catalysts employed in the oxidative reforming and their compatibility with such components of the ethanol feedstock.

The catalytic reforming operation in various embodiments may be carried out with predetermined or otherwise controlled molar ratios of steam to ethanol, and predetermined or otherwise controlled molar ratios of oxygen to ethanol. The molar ratio of steam to ethanol may for example be set or controllably maintained to be in a range of from 0 to 6, and more preferably in a range of from 4 to 6, though the disclosure is not limited thereto, and other ranges or values may be employed. The molar ratio of oxygen to ethanol may for example be set or controllably maintained to be in a range of from 0.1 to 1, and more preferably in a range of from 0.5 to 0.8. though the disclosure is not limited thereto, and other ranges or values of such ratio may be employed.

An important ancillary benefit of utilizing pure oxygen from the electrolyzer in the oxidative reforming system is that it results in a product stream high in hydrogen and carbon dioxide that can be readily separated by membrane separation or pressure swing adsorption, to concentrate the stream of carbon dioxide for low-cost $CO_2$ capture so that the overall process is net negative in greenhouse gas emissions even when using grid power for the electrolyzer.

The integrated electrolysis and oxidative reforming system of the present disclosure may be constituted as a stationary geographic site installation, i.e., as a non-motive system, thereby avoiding deficiencies and disadvantages associated with corresponding motive, e.g., vehicular, implementations. In such stationary installations, the electrolysis system and the oxidative reforming system in the integration are advantageously co-located with one another at a same geographic site, enabling capital equipment expenditures to be minimized and economies of scale to be achieved. Although a co-located integration of the electrolysis system and oxidative reforming system is preferred in the majority of implementations, as for example wherein the electrolysis system and the oxidative reforming system are within a separation distance between each other that in various embodiments is less than at least one of 10 km, 8 km, 6 km, 5 km, 4 km, 3 km, 2.5 km, 2.4 km, 2.3 km. 2.2 km, 2.1 km, 2.0 km, 1.9 km, 1.8 km, 1.7 km, 1.6 km, 1.5 km, 1.4 km, 1.3 km, 1.2 km, 1.1 km, 1.0 km, 0.9 km, 0.8 km, 0.7 km, 0.6 km, 0.5 km, 0.4 km, 0.3 km, 0.2 km, 0.1 km, 0.05 km. 0.025 km. 0.005 km, and 0.001 km, the disclosure is not limited thereto, and the electrolysis system and oxidative reforming system may be integrated with one another in other embodiments at any other suitable separation distances, and may even be sited remotely from one another at vast distances while being integrated in the manner of the present disclosure, such as by flow circuitry, pipelines, and other integration infrastructure.

The present disclosure, in addition to fixed location, large-scale integrated electrolysis and oxidative reforming systems, such as those producing 20,000-100,00 kg hydrogen/day, also contemplates a wide variety of other integrated electrolysis and oxidative reforming systems constructed and arranged to produce hydrogen at other and lesser production levels.

In various embodiments, the present disclosure contemplates modular integrated electrolysis and oxidative reforming systems that may for example produce hydrogen at levels on the order of 100-2000 kg hydrogen/day. Such modular integrated systems are sufficiently compact to enable factory production of the systems and mounting of same on skids or in commercial containers for ready transport to and installation at hydrogen production sites for distributed generation of hydrogen, e.g., at hydrogen fueling stations for motive vehicles operating on hydrogen fuel cells and/or internal combustion engines fueled by hydrogen.

In various embodiments, the non-autothermal reactor system in the integrated oxidative reforming system comprises a unitary non-autothermal adiabatic reactor vessel in which is disposed a staged assembly of catalyst beds, arranged so that exothermic reaction of partial oxidation takes place in a first stage, driving an endothermic reaction of steam reforming in a second stage resulting in a reduction in gas temperature from such endothermic second stage reaction, with water-gas shift (WGS) catalysts being deployed in a high temperature slightly exothermic third stage to convert carbon monoxide to hydrogen, so that the composition of the gas discharged from the vessel is predominantly hydrogen. In various embodiments, the concentration of hydrogen in the discharged gas may be greater than at least one of 50 mol %, 55 mol %, 60 mol %, 65 mol %, 70 mol %, 75 mol %, 80 mol %, 85 mol %, 90 mol %, 95 mol %, 98 mol %, and 99 mol %, and in various embodiments the concentration of hydrogen in the discharged gas be in a range in which the lower end point value is one of the foregoing numeric values and the upper end point value is one of the foregoing numeric values exceeding the lower end point value, e.g., a range of from 50 mol % to 95 mol %, or 55 mol % to 85 mol %, or 60 mol % to 80 mol %, or other suitable range.

The unitary non-autothermal adiabatic reactor vessel in the integrated oxidative reforming and electrolysis system of the disclosure may be constituted and arranged in a variety of different configurations in the broad practice of the present disclosure, and may for example be constructed to have a staged assembly of partial oxidation, steam reforming, and high temperature water gas shift reaction catalyst beds disposed in the adiabatic vessel as discussed above. In other implementations, the adiabatic unitary non-autothermal adiabatic reactor vessel may also contain therein a low temperature water gas shift reaction catalyst bed, in addition to the partial oxidation, steam reforming, and high temperature water gas shift reaction catalyst beds. In still other implementations, the adiabatic reactor vessel may be may be constituted and arranged so that it contains (i) at least one catalyst bed capable of oxidative reforming of hydrocarbons and oxygenates, or (ii) a single catalyst bed that is a mixture of partial oxidation catalyst and steam reforming catalyst, or (iii) a single catalyst bed that is a mixture of a partial oxidation catalyst, a steam reforming catalyst, and a high temperature water gas shift catalyst, or (iv) two catalyst beds including a partial oxidation catalyst bed followed by a steam reforming catalyst bed, or (v) other suitable catalyst bed or combination of beds.

Consistent with the foregoing, the integrated electrolysis and non-autothermal oxidative reforming system may be constituted in various embodiments with a high temperature water gas shift reaction catalyst bed and a low temperature water gas shift reaction catalyst bed that are located downstream of the unitary non-autothermal adiabatic reactor vessel that is employed to conduct the partial oxidation and steam reforming operations. Accordingly, the unitary non-autothermal adiabatic reactor vessel conducting the partial oxidation and steam reforming operations may be provided in a series arrangement with (i) a vessel containing the high temperature water gas shift reaction catalyst, followed by a vessel containing the low temperature water gas shift reaction catalyst, or (ii) a vessel containing both the high temperature water gas shift reaction catalyst and the low temperature water gas shift reaction catalyst therein, e.g., in separate catalyst beds in such vessel.

The integrated electrolysis and non-autothermal oxidative reforming system and process of the present disclosure may in various embodiments be constituted for hydrogen generation or alternatively for syngas generation, and may be integrated or co-located with a $CO_2$ capture and storage system, e.g., being co-located at a stationary geographic site installation, as for example with a separation distance between the $CO_2$ capture and storage system and the oxidative reforming and electrolysis system that is less than at least one of 10 km, 8 km, 6 km, 5 km, 4 km, 3 km, 2.5 km, 2.4 km, 2.3 km, 2.2 km, 2.1 km, 2.0 km, 1.9 km, 1.8 km, 1.7 km, 1.6 km, 1.5 km, 1.4 km. 1.3 km, 1.2 km, 1.1 km, 1.0 km, 0.9 km, 0.8 km, 0.7 km, 0.6 km, 0.5 km, 0.4 km, 0.3 km, 0.2 km, 0.1 km, 0.05 km, 0.025 km, 0.005 km, and 0.001 km, although the disclosure is not limited thereto, and the respective systems may be integrated with one another at any other suitable separation distances, and may even be sited remotely from one another at vast distances while being integrated in the manner of the present disclosure.

The products of the oxidative reforming operation in the integrated electrolysis and non-autothermal oxidative reforming system of the present disclosure are predominantly hydrogen and carbon dioxide (aggregately being 60 mol % or more of the discharged gas). In various embodiments, the aggregated concentration of hydrogen and carbon dioxide in the oxidative reforming discharged gas may be greater than at least one of 60 mol %, 65 mol %, 70 mol %, 75 mol %, 80 mol %, 85 mol %, 90 mol %, 95 mol %, 98 mol %, and 99 mol %, and in various embodiments the concentration of hydrogen and carbon dioxide in the oxidative reforming discharged gas be in a range in which the lower end point value is one of the foregoing numeric values and the upper end point value is one of the foregoing numeric values exceeding the lower end point value. The integrated electrolysis and non-autothermal oxidative reforming system is desirably operated to produce a stream of high purity hydrogen, preferably having a hydrogen purity greater than at least one of 98 mol %, 98.5 mol %, 98.9 mol %, 99 mol %, 99.5 mol %, 99.9 mol %, 99.95 mol %, 98.99 mol %, and 99.999 mol %, or in a range in which the lower end point value is one of the foregoing numeric values and the upper end point value is one of the foregoing numeric values exceeding the lower end point value.

Producing a stream of high purity hydrogen from the oxidative reforming system requires the provision of a separation system to recover hydrogen, separating it from the hydrogen-containing stream comprising carbon dioxide, unreacted hydrocarbons, and carbon monoxide that is produced by the oxidative reforming operation. After separation of the hydrogen, secondary/waste products generated by the hydrogen separation, e.g., tail gas containing carbon dioxide, unreacted hydrocarbons, carbon monoxide, and unrecovered (residual) hydrogen, may be used to preheat the oxidative reforming reactants prior to the conversion process. If the waste stream from the hydrogen separation has sufficient caloric value, oxygen from the electrolysis system may be used in combustion of the waste stream to yield a flue gas of carbon dioxide and steam. The flue gas may be processed to condense the steam, and the carbon dioxide can be captured utilizing conventional methods and equipment, and optionally sequestered by any of applicable sequestration techniques known in the art. Such operation of the integrated system yields an overall hydrogen production from the integrated system that is negative in greenhouse gas emissions.

Figure 1B:
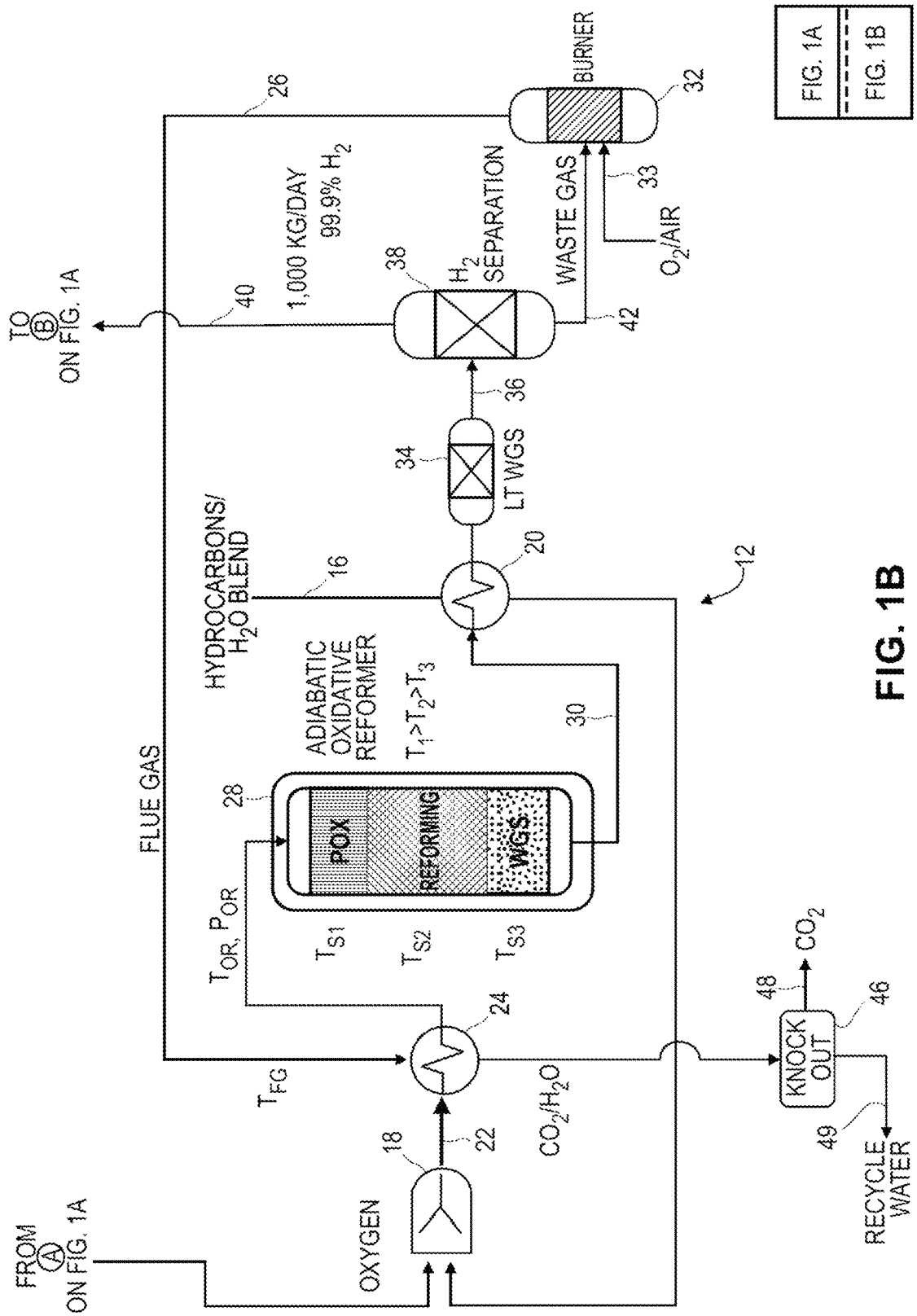

Referring now to the drawings, FIGS. 1A and 1B show a schematic flow sheet of a hydrogen generation system 100 according to one embodiment of the present disclosure, integrating a non-autothermal oxidative reforming process system 12 with a low temperature electrolysis system 14.

The non-autothermal oxidative reforming system 12 includes a water-ethanol source ("Hydrocarbons/$H_2O$ Blend"), from which an aqueous solution of ethanol is delivered in the water-ethanol supply line 16 with passage through heat exchanger 20 to the feedstock blender 18 for mixing with oxygen supplied from the oxygen storage vessel 73 in oxygen feed line 44. The resulting ethanol/water/oxygen feedstock stream is flowed in feedstock delivery line 22 through heat exchanger 24 to the non-autothermal oxidative reforming reactor 28.

The non-autothermal oxidative reforming reactor 28 as schematically illustrated is a segmented adiabatic reactor containing an upper partial oxidation segment and including suitable catalyst for effecting partial oxidation of the feedstock introduced at suitable temperature ($T_{OR}$) and pressure ($P_{OR}$) in feedstock delivery line 22. The temperature in such initial partial oxidation segment ($T_{S1}$) may be in a range of from about 700° C. to about 900° C., as appropriate to carry out the partial oxidation of the feedstock. Proceeding in the flow direction of gas flow through the adiabatic reactor, gas flowing from the initial partial oxidation segment then flows through the intermediate reforming segment containing suitable steam reforming catalyst so that steam reforming reaction is carried out at temperature ($T_{S2}$) in a range of from about 450° C. to about 850° C., with gases then flowing from the intermediate (second) steam reforming segment through the third segment of the adiabatic reactor containing high temperature water gas shift catalyst, in which high temperature water shift reaction is carried out at temperature ($T_{S3}$) that may be in a range of from about 300° C. to about 420° C., to produce a reformate containing hydrogen that is discharged from the adiabatic reactor in non-autothermal oxidative reforming reactor discharge line 30.

In the adiabatic reactor, the respective partial oxidation, steam reforming, and water gas shift reactions are catalytically carried out with the temperatures in the respective partial oxidation ($T_{S1}$), steam reforming ($T_{S2}$), and water gas shift reaction ($T_{S3}$) segments being maintained so that $T_{S1} > T_{S2} > T_{S3}$.

The oxygen storage tank 73 storing oxygen produced by the low temperature electrolysis system 14 and used to supply oxygen to the non-autothermal oxidative reforming system 12 may be of appropriate size and capacity to effectively buffer the oxygen-generating capacity of the low temperature electrolysis system 14, so that oxygen is sent from the low temperature electrolysis system to such buffer storage tank, for subsequent discharge therefrom to the oxygen feed line 44 in the quantity and at the rate required to supply the non-autothermal oxidative reforming system 12. In this manner, the low temperature electrolysis system and the non-autothermal oxidative reforming system may be selectively "matched" with one another in operation, with respect to operating conditions and throughput of both the electrolysis and non-autothermal oxidative reforming systems of the integrated overall system.

Thus, in the operation of the illustrative FIG. 1A and 1B system, in which ethanol is employed as a feedstock hydrocarbon, the ethanol is catalytically reacted with oxygen and water in the non-autothermal oxidative reforming reactor 28 to form a mixture including hydrogen, carbon monoxide, water, and carbon dioxide, which then undergoes the high temperature water gas shift reaction whereby the CO is converted to $CO_2$ and $H_2$ through reaction with steam deriving from the water originally supplied to the non-autothermal oxidative reforming system from the water-ethanol source. The resulting gas is discharged from the non-autothermal oxidative reforming reactor 28 in discharge line 30 and flows through the heat exchanger 20 to heat the aqueous solution of ethanol being introduced to the system in water-ethanol supply line 16, and then enters the low temperature water gas shift reactor 34, in which at least a portion of the remaining CO in the stream is converted to $CO_2$ and $H_2$. The resulting gas stream containing hydrogen and $CO_2$ is discharged from the low temperature water gas shift reactor 34 in low temperature water gas shift reactor discharge line 36, and flows into hydrogen gas purifier 38.

In the hydrogen gas purifier 38, the water gas shift reactor effluent stream is separated into hydrogen, discharged from the purifier in hydrogen gas discharge line 40, and $CO_2$-containing waste gas, which is discharged from the hydrogen gas purifier 38 in waste gas discharge line 42. Hydrogen is flowed in the hydrogen gas discharge line 40 to the hydrogen gas storage reservoir 90 in the low temperature electrolysis system 14, to supplement hydrogen gas that is produced by the low temperature electrolysis of water in the polymer electrolyte membrane (PEM) electrolyzer 66.

The hydrogen gas purifier while shown schematically by a unitary vessel in FIG. 1B may be of any suitable type, and may in various embodiments comprise a single bed or alternatively a multi-bed pressure swing adsorption (PSA) unit in which each adsorbent bed undergoes active adsorption operation and subsequent desorption/regeneration operation according to a predetermined sequence of operations. In other embodiments, the hydrogen gas purifier may comprise a membrane separation apparatus.

The low temperature electrolysis system 14 as schematically shown in FIGS. 1A and 1B includes a feed water source 50 from which feed water is flowed by the action of feed water pump 52 through the water filter/purifier 54 to the oxygen-water phase separation and supply vessel 56. The oxygen-water phase separation supply vessel 56 supplies water in water feed line 58 that is flowed by the circulation pump 60 through heat exchanger 62 and ion exchanger 64 to the electrolyzer 66, whose cathode is connected by appropriate circuitry to a transformer and rectifier.

In the electrolyzer 66, the water is dissociated into hydrogen and oxygen, with the oxygen being flowed from the electrolyzer 66 in line 68 to the oxygen-water phase separation and supply vessel. The oxygen entering the oxygen-water phase separation and supply vessel passes through the feed water therein and is discharged as an overhead stream in oxygen discharge line 72 containing oxygen demister vessel 70 and flow control valve 74.

From oxygen discharge line 72, the product oxygen stream from the low temperature electrolysis system 14 passes to the oxygen storage vessel 73, from which oxygen is supplied in oxygen feed line 44 to the non-autothermal oxidative reforming system 12 to provide oxygen for the non-autothermal oxidative reforming that is conducted in non-autothermal oxidative reforming reactor 28.

The hydrogen that is generated by the water dissociation reaction in electrolyzer 66 is discharged from the electrolyzer in hydrogen outlet line 76 and flows to gas-liquid separator vessel 78 in which the hydrogen gas is disengaged from water, with the water being recycled to the electrolyzer. A portion of the water recycled to the electrolyzer may be flowed in the electrolyzer recycle line 128 containing flow control valve 130 to the intake of the circulation pump 60. The hydrogen is discharged from the gas-liquid separator vessel 78 as an overhead gas stream that flows in hydrogen delivery line 80 through the hydrogen demister vessel 82, heat exchanger 84, condensate trap 86, and flow control valve 88 to the hydrogen gas storage reservoir 90, which as previously described also receives hydrogen from the non-autothermal oxidative reforming system in hydrogen gas discharge line 40.

Hydrogen gas from the hydrogen gas storage reservoir 90 may be selectively withdrawn from the reservoir in hydrogen discharge line 94 and flowed to hydrogen compressor 92. The compressor compresses the withdrawn hydrogen to appropriate pressure. The compressed hydrogen then flows from the compressor in hydrogen supply line 96 containing flow control valve 98 to a downstream use or transport destination, e.g., a hydrogen fuel cell, a hydrogen-utilizing chemical process facility, a hydrogen transport pipeline, or other use or disposition destination.

Thus, the hydrogen generation system 10 schematically depicted in FIGS. 1A and 1B may be configured to enable the non-autothermal oxidative reforming system to operate in a thermally neutral manner (e.g., corresponding to $x \approx 0.40$ in reaction (1)), and with the electrolyzer being sized and configured to provide the required amount of oxygen for the non-autothermal oxidative reforming of ethanol for such thermally neutral operation, so that no external source of heat is required, and no excess heat is produced.

The FIGS. 1A and 1B hydrogen generation system 10 may additionally comprise a process controller 132 having bidirectional signal transmission lines 134 and 136 coupled thereto and shown schematically to denote their coupling to process equipment components, such as pumps, compressors, flow control valves, heat exchangers, and sensors for sensing process conditions (e.g., temperatures, pressures, flow rates, and compositions, which sensed conditions are transmitted to the process controller by the signal transmission lines coupled to the sensors), for monitoring and controlling the process system. For such purpose, the process controller may comprise suitable signal processing components and processors such as computers, programmable logic control devices, etc., as appropriate for the monitoring and control operations to be performed by the process controller.

For example, the process controller may be arranged to control temperature in the unitary adiabatic reactor hereinafter more fully described in connection with FIG. 3 hereof, so that partial oxidation reaction is carried out in the first catalyst bed at temperature in a range of from about 700° C. to about 900° C., steam reforming reaction is carried out in the second catalyst bed at temperature in a range of from about 450° C. to about 850° C., and high temperature water gas shift reaction is carried out in the third catalyst bed at temperature in a range of from about 300° C. to about 420° C.

In various embodiments, the process controller may be arranged to coordinate operation of the electrolyzer and non-autothermal oxidative reforming system in the hydrogen generation system so that the non-autothermal oxidative reforming system carries out the reaction $C_2H_5OH + (3-2x) H_2O + xO_2 \rightarrow (6-2x)H_2 + 2CO_2$ wherein $0 < x < 1.5$, or in a further specific embodiment wherein $0.30 < x < 0.50$, or in other embodiments in which x has other values or ranges, e.g., $0.10 \leq x \leq 1.1$; $0.3 \leq x \leq 0.9$; $0.3 \leq x \leq 0.5$; or $0.75 \leq x \leq 0.85$; or x may for example be about 0.4, 0.5, 0.65, 0.80, 1.0, or other suitable value, although the disclosure is not limited thereto.

In various embodiments, the electrolyzer used in the hydrogen generation system may comprise a solid oxide electrolyzer, and the process controller may be arranged to coordinate operation of the electrolyzer and non-autothermal oxidative reforming system so that the non-autothermal oxidative reforming system generates excess heat for transfer to the solid oxide electrolyzer so that the solid oxide electrolyzer operates at thermal efficiency greater than 50%.

By way of specific example, the FIGS. 1A and 1B hydrogen generation system 10 may be constructed and arranged as a 1500 kg $H_2$/day hydrogen station for local filling operations, e.g., for fuel cell vehicles such as automobiles, trucks, vans, forklifts, buses, robotic delivery caddies, and other motive delivery and transport systems. Table 1 below summarizes the inputs and outputs of a 0.5 megawatt (MW) low temperature electrolyzer, and the inputs and outputs of a non-autothermal ethanol oxidative reformer, operating at x=0.40 (reaction (1)), in such illustrative 1500 kg $H_2$/day hydrogen station.

TABLE 1

Operational Inputs and Outputs of 1500 kg $H_2$/Day Hydrogen Station

| Inputs | Outputs |
|---|---|
| 0.5 MW Low Temperature Electrolyzer | |
| 1800 kg $H_2O$/day | 200 kg $H_2$/day |
| 11.0 MWh/day (at 55.7 kWh/kilogram $H_2$) | 1600 kg $O_2$/day |
| Non-Autothermal Ethanol Oxidative Reformer, Operating at x = 0.40 (reaction (1)) | |
| 5750 kg ethanol/day (1920 gallons/day) | 1300 kg $H_2$/day |
| 4950 kg $H_2O$/day (600 gallons/day) | 11000 kg $CO_2$/day |
| 1600 kg $O_2$/day | |

If the $CO_2$ produced from the non-autothermal oxidative reformer in the FIGS. 1A and 1B hydrogen generation system is derived from bioethanol and the electrolysis apparatus utilizes a green power source, the net carbon dioxide balance for the overall system may approach zero. In various embodiments, the hydrogen generation system of the present disclosure may incorporate or utilize a $CO_2$ capture or $CO_2$ sequestration system to provide a net negative $CO_2$ balance or emission. In various embodiments, the respective non-autothermal oxidative reforming system and the low temperature electrolysis system may be constructed and arranged to share various infrastructure components such as for example a water treatment system, a control system, compression equipment, and hydrogen storage vessels. It will be recognized that the construction, arrangement, components, and operation of the hydrogen generation system may be widely varied in the broad practice of the present disclosure.

Figure 2A:
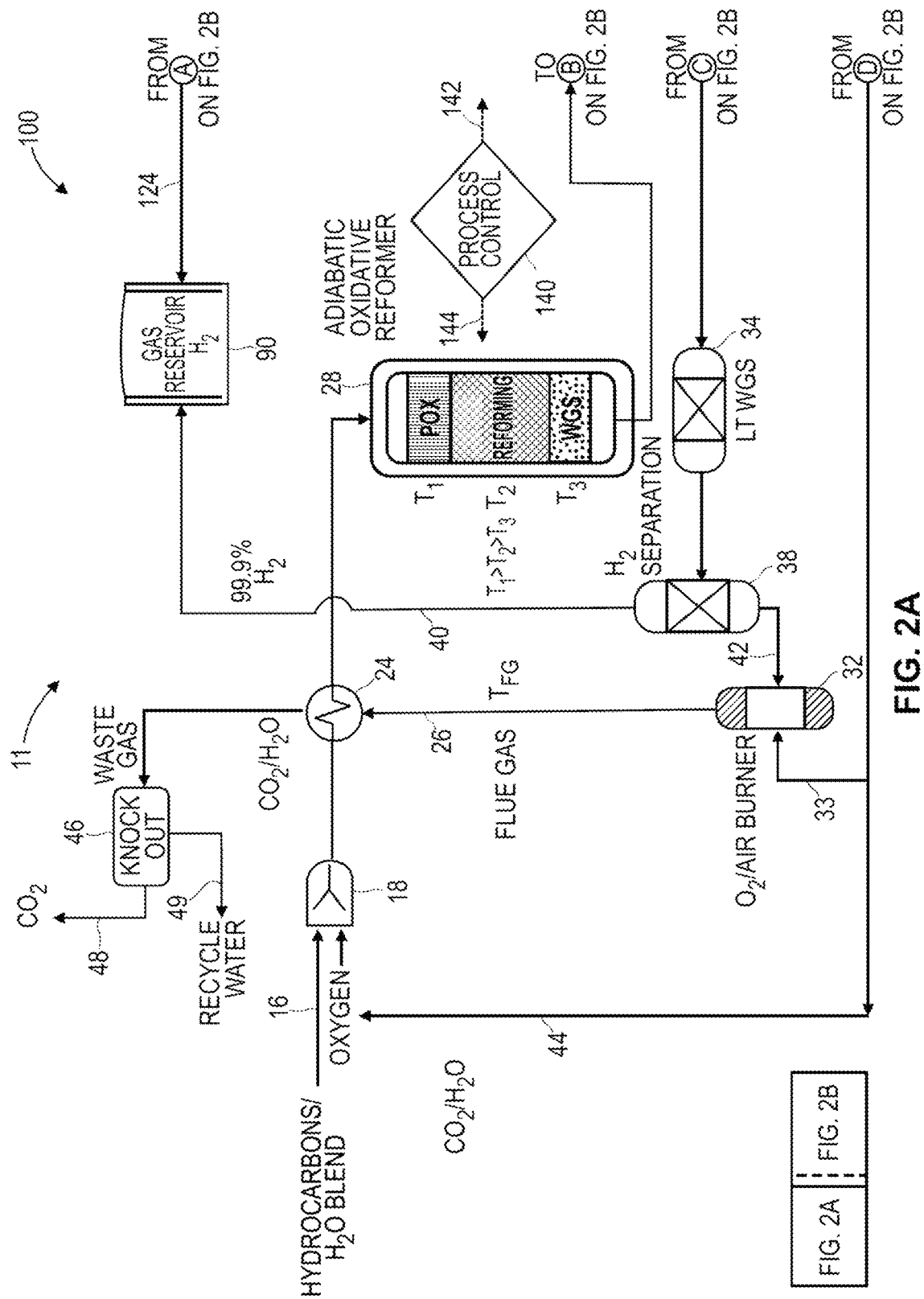
FIG. 2A and 2B show a schematic flow sheet of a hydrogen generation system according to another embodiment of the present disclosure, integrating an oxidative reforming process system with a high temperature electrolysis system.
Figure 2B:
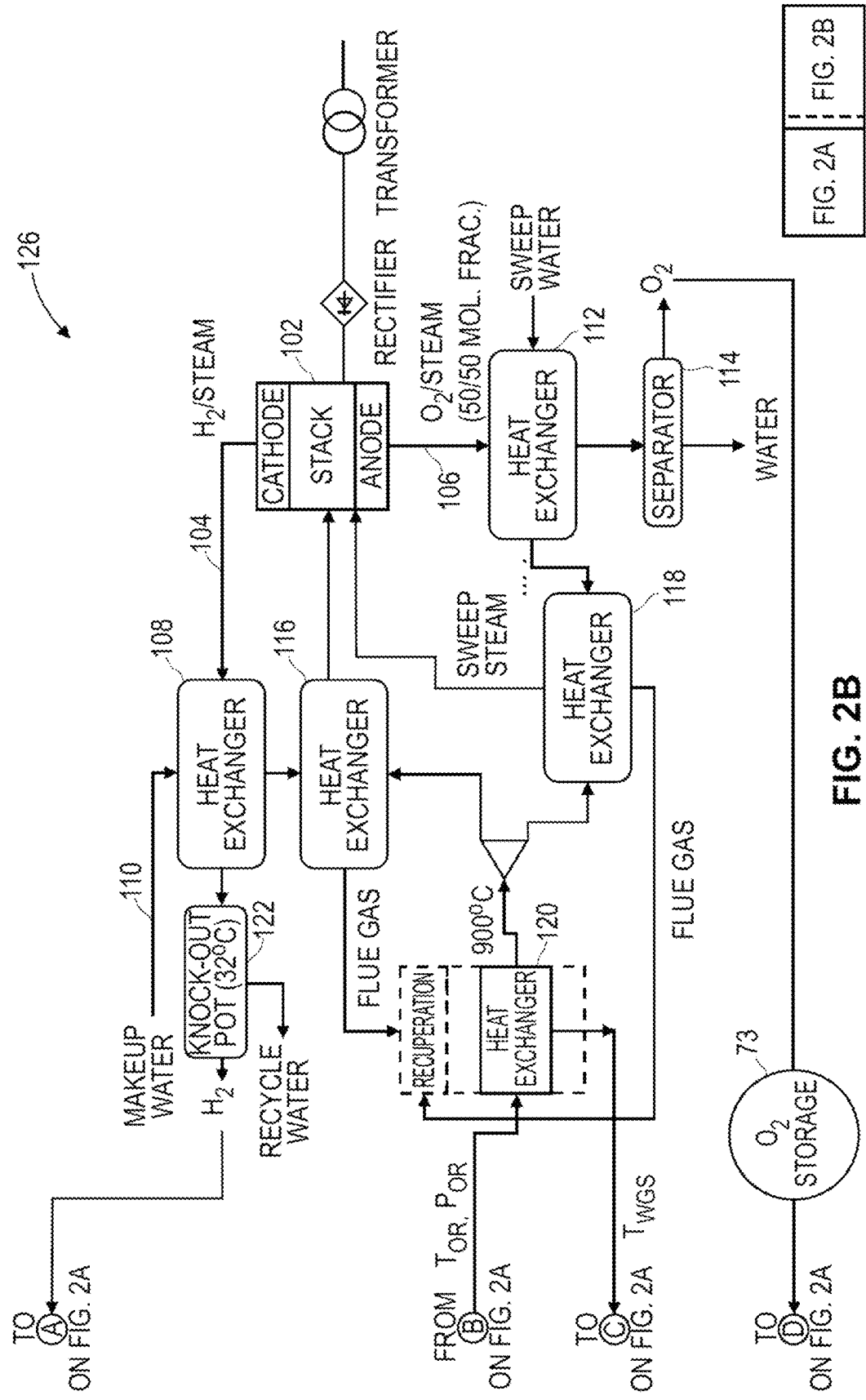

FIGS. 2A and 2B show a schematic flow sheet of a hydrogen generation system 100 according to another embodiment of the present disclosure, integrating a non-autothermal oxidative reforming process system 11 with a high temperature electrolysis system 126.

The non-autothermal oxidative reforming system in FIGS. 2A and 2B is of a same generalized arrangement as the non-autothermal oxidative reforming system in FIGS. 1A and 1B, with a non-autothermal oxidative reforming reactor 28 that is supplied with oxygen in oxygen feed line 44 from oxygen storage vessel 73, as previously described in connection with the hydrogen generation system of FIGS. 1A and 1B. The correspondingly numbered components of the non-autothermal oxidative reforming system 11 are to be understood as corresponding to the same or similar numbered components as previously described in connection with the hydrogen generation system of FIGS. 1A and 1B.

The oxygen storage tank 73 in the FIGS. 2A and 2B system can be used to selectively "buffer" the overall operation of the non-autothermal oxidative reforming system and high temperature electrolysis system, similar to the function and operation of the oxygen storage tank 73 in the FIGS. 1A and 1B system, as previously described.

The high temperature electrolysis system 126 in the hydrogen generation system 100 of FIGS. 2A and 2B may utilize any suitable high temperature electrolyzer, such as for example a high temperature solid oxide electrolyzer 102, for dissociating water into hydrogen and oxygen. As schematically illustrated, the high temperature solid oxide electrolyzer 102 is coupled by appropriate circuitry with a transformer and rectifier.

Makeup water is furnished to the high temperature electrolysis system in makeup water supply line 110 and flows through heat exchanger 108 and heat exchanger 116 to the high temperature solid oxide electrolyzer 102. At the cathode of the high temperature solid oxide electrolyzer, a hydrogen/steam product stream is discharged in hydrogen/steam discharge line 104 and passes through heat exchanger 108 and then to a knock-out pot 122, which may for example be operated at temperature of 32° C. or other suitable temperature or in other suitable temperature range of operation. The knockout pot 122 discharges a condensed recycle water stream, and a product hydrogen stream that is discharged in hydrogen discharge line 124 and flowed to the hydrogen gas storage reservoir 90.

The high temperature solid oxide electrolyzer 102 at the anode thereof produces an oxygen/steam mixture, e.g., at a 50/50 mole fraction of oxygen and water. The $O_2$/steam mixture is flowed in oxygen/steam discharge line 106 through heat exchanger 112 to oxygen/water separator 114. The oxygen/water separator 114 discharges the separated water, and the correspondingly separated oxygen is discharged into oxygen feed line 44 for flow to the oxygen storage vessel 73, from which oxygen is supplied to the non-autothermal oxidative reforming system 11.

In the high temperature electrolysis system 126, sweep water may be flowed to heat exchanger 112 and then to heat exchanger 118, and sweep steam may be supplied from heat exchanger 118 to the high temperature solid oxide electrolyzer 102.

Thermal integration of the high temperature electrolysis system 126 and non-autothermal oxidative reforming system 11 may be implemented using a thermal recovery assembly 120, with a stream of hydrogen, carbon monoxide, carbon dioxide, and water being flowed from the non-autothermal oxidative reforming reactor 28 through a heat exchanger in the thermal recovery assembly 120, and with recirculation of flue gas in a flow circuit that includes heat exchanger 116, heat exchanger 118, and the heat exchanger in the thermal recovery assembly 120. The thermal recovery assembly 120 may also include a thermal recuperator ("Recuperation") for heat recovery. Such thermal recuperator may be of any suitable type, and may for example be of a vertical flat panel configuration, or a horizontal flat panel configuration, or a cellular configuration, or more generally may be of a cross-flow, parallel flow, or rotary flow type, in various specific embodiments of the high temperature electrolysis system. Any appropriate heat recovery elements and/or devices may be utilized in such thermal recovery assembly, including heat pipes, thermal wheels, heat sinks, etc.

In a hydrogen generation system of the generalized type shown in FIGS. 2A and 2B. the high temperature electrolyzer is sized to provide the required oxygen to the non-autothermal oxidative reforming system such that the excess heat from the non-autothermal oxidative reforming reaction can be transferred and used efficiently to meet the thermal requirements of the high temperature electrolyzer (solid oxide electrolyzer in the embodiment illustrated in FIGS. 2A and 2B). By operating the non-autothermal oxidative reforming system to produce excess heat, the high temperature electrolyzer is able to operate at an improved thermal efficiency, e.g., greater than 50%, and in various embodiments on the order of 75% or higher. Unlike PEM or alkaline electrolyzers, solid oxide electrolyzers can run at pressure levels that are the same as the pressure levels at which the non-autothermal oxidative reforming system is operated.

In the hydrogen generation system illustratively shown in FIGS. 2A and 2B, the product stream from the non-autothermal oxidative reforming reactor 28 is flowed at temperature $T_{OR}$ and pressure $P_{OR}$ to the high temperature electrolyzer heat exchanger in the thermal recovery assembly 120, providing the required heat to convert water to high-temperature/high-pressure steam. Passing through this heat exchanger, the product gas from the non-autothermal oxidative reforming is reduced to an appropriate temperature $T_{WGS}$ for the low temperature water gas shift reaction required to convert any carbon monoxide to carbon dioxide, and flows to the low temperature water gas shift reactor 34. In the low temperature water gas shift reactor 34, the product stream undergoes a catalytic shift reaction to reduce the CO content in the product gas to suitably low level, e.g., less than 1 volume %, based on the volume of the product gas.

The product gas from the low temperature water gas shift reactor 34 flows to hydrogen gas purifier 38, in which the product gas is separated into hydrogen, discharged from the purifier in hydrogen gas discharge line 40, and $CO_2$-containing waste gas, which is discharged from the hydrogen gas purifier 38 in waste gas discharge line 42. Hydrogen is flowed in the hydrogen gas discharge line 40 to the hydrogen gas storage reservoir 90 in which such hydrogen gas is stored with the hydrogen gas that is produced by the high temperature electrolysis of water in the high temperature solid oxide electrolyzer 102.

The waste gas discharged from the hydrogen gas purifier 38 in waste gas discharge line 42 flows to the oxygen/air burner 32 ("$O_2$/Air Burner"). The oxygen/air burner 32 is supplied with oxygen from oxygen storage vessel 73 flowing in oxygen feed line 44, via burner oxygen/air feed line 33. The oxygen/air burner 32 produces a flue gas that is discharged in flue gas line 26, and flows through heat exchanger 24 for heating of the ethanol/water/oxygen stream being flowed to the non-autothermal oxidative reforming reactor 28, and the flue gas containing carbon dioxide and water ($CO_2/H_2O$) is flowed as waste gas to the carbon dioxide recovery vessel 46, where it is separated into a CO2 stream, discharged from the carbon dioxide recovery vessel 46 in carbon dioxide discharge line 48, and a recycle water stream, discharged from the carbon dioxide recovery vessel 46 in recycle water discharge line 49.

The $CO_2$ discharged in carbon dioxide discharge line 48 may be flowed to a $CO_2$-utilization facility, or to a $CO_2$ capture or sequestration facility, or to other disposition or use.

The recycle water stream discharged from the carbon dioxide recovery vessel 46 in recycle water discharge line 49 may be recycled in the hydrogen gas generation system 100 to the electrolyzer, and/or may be utilized for forming the aqueous solution of ethanol and/or other hydrocarbons ("Hydrocarbons/$H_2O$ Blend") that is combined with oxygen and flows as a feedstock to the adiabatic non-autothermal oxidative reforming reactor 28.

In a thermally integrated non-autothermal oxidative reforming system and high temperature electrolysis system, of a general type illustratively shown in FIGS. 2A and 2B, shared equipment coupled with efficiency gains from thermal integration enables a compact hydrogen generation system to be achieved, with substantially lower capital costs than would be incurred by use of either system alone.

The FIGS. 2A and 2B hydrogen generation system 100, similar to the FIGS. 1A and 1B system previously described, may additionally comprise a process controller 140 having bidirectional signal transmission lines 142 and 144 coupled thereto and shown schematically to denote their coupling to process equipment components, such as pumps, compressors, flow control valves, heat exchangers, and sensors for sensing process conditions (e.g., temperatures, pressures, flowrates, compositions, which sensed conditions are transmitted to the process controller by the signal transmission lines coupled to the sensors), for monitoring and controlling the process system. The process controller may be constituted and operate as previously described for the process controller in FIGS. 1A and 1B, e.g., for controlling temperature in the unitary adiabatic non-autothermal oxidative reforming reactor so that partial oxidation, steam reforming, and water gas shift reactions are carried out at predetermined temperature conditions, and/or for controlling other process conditions of flow rate, pressure, composition, etc. to achieve a desired output of hydrogen from the integrated oxidative reforming and electrolysis systems in the hydrogen generation system.

For example, in various embodiments, the process controller in the FIGS. 2A and 2B hydrogen generation system may be arranged to coordinate operation of the electrolyzer and non-autothermal oxidative reforming system in the hydrogen generation system so that the non-autothermal oxidative reforming system carries out the reaction $C_2H_5OH+(3-2x)H_2O+xO_2 \rightarrow (6-2x)H_2+2CO_2$ wherein $0 < x < 1.5$, or in a further specific embodiment wherein $0.30 < x < 0.50$, or wherein x is in another suitable range of values, e.g., $0.10 \leq x \leq 1.1$; $0.3 \leq x \leq 0.9$; $0.3 \leq x \leq 0.5$; or $0.75 \leq x \leq 0.85$; or x may for example be about 0.4, 0.5, 0.65, 0.80, 1.0, or other suitable value, although the disclosure is not limited thereto.

The process controller may additionally, or alternatively, be arranged to coordinate operation of the high temperature electrolyzer and non-autothermal oxidative reforming system so that the non-autothermal oxidative reforming system generates excess heat for transfer to the high temperature electrolyzer, e.g., solid oxide electrolyzer, so that the high temperature electrolyzer operates at thermal efficiency greater than 50%.

Table 2 below summarizes the inputs and outputs of a 1.2 megawatt (MW) high temperature electrolyzer, and the inputs and outputs of a non-autothermal ethanol oxidative reformer, operating at x=0.40 (reaction (1)), in such illustrative 1500 kg $H_2$/day hydrogen station.

TABLE 2

Operational Inputs and Outputs of 1500 kg $H_2$/Day Hydrogen Station

| Inputs | Outputs |
|---|---|
| 1.2 MW High Temperature Electrolyzer | |
| 4500 kg $H_2O$/day | 500 kg $H_2$/day |
| 27.8 MWh/day (at 55.7 kWh/kilogram $H_2$) | 4000 kg $O_2$/day |

TABLE 2-continued

Operational Inputs and Outputs of 1500 kg $H_2$/Day Hydrogen Station

| Inputs | Outputs |
|---|---|
| Non-Autothermal Ethanol Oxidative Reformer, Operating at x = 1.0 (reaction (1)) | |
| 5750 kg ethanol/day (1920 gallons/day) | 1000 kg $H_2$/day |
| 2250 kg $H_2O$/day (600 gallons/day) | 11000 kg $CO_2$/day |
| 4000 kg $O_2$/day | |

The hydrogen generation systems of the present disclosure may incorporate and utilize various hydrogen purification apparatus, materials, and techniques to achieve a desired purity and composition of the product hydrogen from such systems. For example, contaminants and impurities may be removed from the hydrogen product by use of physical adsorbents, chemisorbents, condensation or solidification techniques, wet scrubbing, complexation and precipitation, or any other appropriate techniques for the specific contaminant or impurity species involved.

It will be recognized that the hydrogen generation systems of FIGS. 1A and 1B, and FIGS. 2A and 2B are shown in schematic renderings without reference to valves, pumps, compressors, etc. that may be implemented in the respective systems as physically constructed. arranged, and operated.

The integrated hydrogen generation systems of the present disclosure may be configured and operated to carry out the non-autothermal oxidative reforming in a feedstock-flexible manner that accommodates a spectrum of varied bio-derived carbon-based feedstocks, by appropriate design or selection of oxidative reformer equipment and non-autothermal oxidative reforming catalyst. By such design and selection, a variety of alternatively available feedstocks may be utilized, such as for example biomethanol, biodiesel, and biomethane, although the disclosure is not limited thereto.

The integrated hydrogen generation systems of the present disclosure may be implemented with high temperature water gas shift (HTWGS) reaction being carried out in the unitary adiabatic non-autothermal oxidative reforming reactor, and with low temperature water gas shift (LTWGS) reaction being carried out in a separate low temperature water gas shift reactor, as illustratively shown in connection with FIGS. 1A and 1B, and FIGS. 2A and 2B. In other implementations of the integrated hydrogen generation systems of the present disclosure, low temperature water gas shift reaction may be carried out in the oxidative reforming reactor, as a discrete segment of the reactor downstream of the high temperature water gas shift reaction segment, which in turn is downstream of the steam reforming segment, which in turn is downstream of the partial oxidation segment. It will correspondingly be appreciated that the oxidative reforming reactor may be varied in its components and construction, within the broad scope of the present disclosure. The oxidative reforming reactor thus may be a segmented reactor including partial oxidation, steam reforming, and high temperature water gas shift segments, with an optional low temperature water gas shift segment, as segments within a single reactor vessel. In such unitary oxidative reforming reactor, the respective partial oxidation, steam reforming, and water gas shift reactions can take place in a single vessel with the catalysts for each reaction being segregated, e.g., by a porous ceramic or metal divider or other segregation structure or arrangement.

Figure 3:
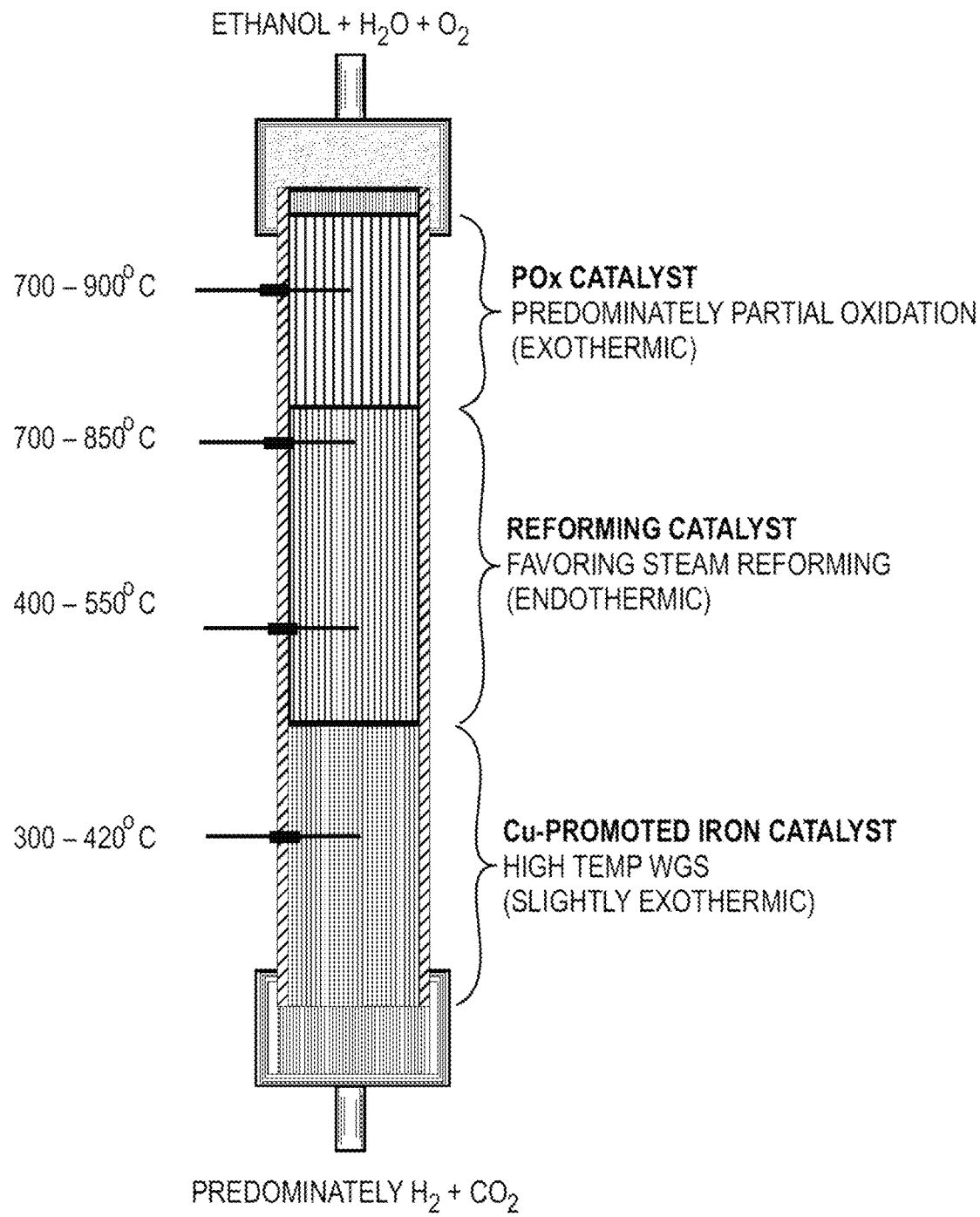
FIG. 3 is a schematic representation of a segmented adiabatic reactor of a type useful for the hydrogen generation system and process of the present disclosure, in one embodiment thereof.

FIG. 3 is a schematic representation of a non-autothermal segmented adiabatic reactor of a type useful for the hydrogen generation system and process of the present disclosure, in one embodiment thereof.

As illustrated, the segmented adiabatic reactor is depicted in a vertically upstanding orientation with an upper inlet end coupled with a feed conduit delivering ethanol (and/or other hydrocarbons or feedstock components), water, and oxygen into the reactor vessel. The reactor vessel is of cylindrical configuration, having a circular cross-section in a transverse plane perpendicular to the flow direction of the gases flowed through the reactor vessel. An upper inlet end cap or flange is secured to the upper end of the cylindrical housing of the reactor vessel, joined to the feed conduit, and defines an interior inlet headspace for receiving the ethanol, water, and oxygen reactants, for subsequent downflow through the reactor to the lower discharge end thereof.

At the discharge end, a lower outlet end cap or flange is secured to the lower end of the cylindrical housing of the reactor vessel and defines an interior outlet plenum receiving the predominantly hydrogen and carbon dioxide reaction products and unreacted reactant species from the successive partial oxidation, steam reforming, and water gas shift reactions, for discharge through the discharge conduit joined to the lower outlet end cap or flange.

The segmented adiabatic reactor may be formed of non-conductive material, and/or may be wrapped or coated with a thermal insulation material, or otherwise may be constructed and arranged to establish and maintain the adiabatic character of the reactor.

In the interior volume of the segmented adiabatic reactor, the different catalysts are arranged in vertically successive beds that may be physically separated from one another by physical separation elements or structure, e.g., screen elements, foraminous discs, porous frits, or other separation structures or arrangements that permit sequential fluid flow through the successive beds without excessive pressure drop or hydrodynamic flow anomalies such as channeling or dead spaces.

The uppermost catalyst bed comprises a partial oxidation catalyst (the catalyst comprising, e.g., rhodium, palladium, platinum, rhenium, ruthenium, lanthanum, zirconium, strontium, calcium, yttrium, cerium, nickel, cobalt, or mixed metal oxide, or combinations or mixtures of metals and/or metal oxides) that mediates the predominantly partial oxidation exothermic reaction of the reactants at temperature that may for example be in a range of 700-900° C., although the disclosure is not limited thereto.

The next lower catalyst bed comprises a steam reforming catalyst (the catalyst comprising, e.g., promoted nickel, ruthenium, rhenium, rhodium, copper, zinc, cobalt, mixed metal oxides, or combinations or mixtures of metals and/or metal oxides, with specific embodiments utilizing supports such as alumina, silica, aluminosilicates, and with specific embodiments utilizing promoters such as potassium, magnesium, strontium, calcium, or the like) that mediates the endothermic steam reforming reaction of the partial oxidation reaction products from the first (uppermost) catalyst bed, with an upper portion of the promoted nickel catalyst bed being at a temperature that may for example be in a range of 700-850° C., and with a lower portion of the steam reforming catalyst bed being at a temperature that may for example be in a range of 400-550° C. although the disclosure is not limited to such temperature ranges, and other suitable temperature conditions may be employed in the catalytic steam reforming reaction.

Under the steam reforming catalyst bed, the next lower catalyst bed comprises a high temperature water gas shift catalyst (the catalyst comprising, e.g., iron, chromium, calcium, lanthanum, cobalt, strontium, platinum, copper-promoted iron, iron-chromium, copper, zinc, copper-zinc, nickel, iron oxide, chromium oxide, or other mixed metal oxides, or combinations and/or mixtures of metals or metal oxides) mediating the high temperature water gas shift reaction of the endothermic steam reforming reaction products. The high temperature water gas shift catalyst bed is at temperature that may for example be in a range of from 300-450-300° C., although the disclosure is not limited thereto.

Although not shown in the illustrated reactor configuration in FIG. 3, the reactor in various embodiments may further include an optional fourth catalyst bed comprising a low temperature water gas shift catalyst located inside the adiabatic reactor, or a separate low temperature water gas shift reactor vessel may be provided containing the low temperature water gas shift catalyst, with the product gas from the adiabatic reactor flowing to the separate low temperature water gas shift reactor. The low temperature water gas shift catalyst may be of any suitable type, and may for example comprise zinc, platinum, molybdenum, a copper-based catalyst such as copper, copper-zinc oxide, copper oxide, copper oxide-zinc oxide, copper oxide-zinc oxide-alumina, copper oxide-zinc oxide-chromium oxide or other mixed metal oxides or mixtures of metals and/or metal oxides.

By the successive reactions of partial oxidation in the first catalyst bed, steam reforming in the second catalyst bed, and high temperature water gas shift reaction in the third catalyst bed, and optionally, a secondary low temperature water gas shift reaction in a fourth catalyst bed, the reaction

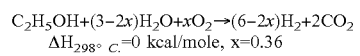

$$C_2H_5OH+(3-2x)H_2O+xO_2\rightarrow(6-2x)H_2+2CO_2$$
$$\Delta H_{298°\,C.}=0\text{ kcal/mole, }x=0.36$$

is carried out, and the hydrogen and carbon dioxide product stream, additionally containing unreacted reactants from the respective reactions in the segmented adiabatic reactor, is discharged from the reactor in the product discharge conduit at the outlet end thereof.

It will be recognized that the specific catalyst materials described above in the description of the non-autothermal segmented adiabatic reactor are illustratively identified, and that other specific catalyst materials may be utilized in various embodiments of the hydrogen generation systems and processes of the present disclosure.

It also is to be recognized that although the reactor is illustratively shown and described with reference to FIG. 3 as having a vertically oriented cylindrical conformation, with a circular cross-section, for downflow gas flow operation, the present disclosure is not thus limited, and the reactor may be of any other suitable conformation, orientation, and flow configuration appropriate to the integration of the reactor with the electrolyzer in the hydrogen generation system and process. The reactor may have any suitable size, shape, orientation, and configurational character, including fixed beds, fluidized beds, rotating beds, motive belt beds, etc., and the reactor may have any aspect ratio (e.g., length/diameter ratio) or other dimensional characteristics, with cross-sections generally perpendicular to the flow direction that are geometrically regular or irregular, etc.

Figure 4:
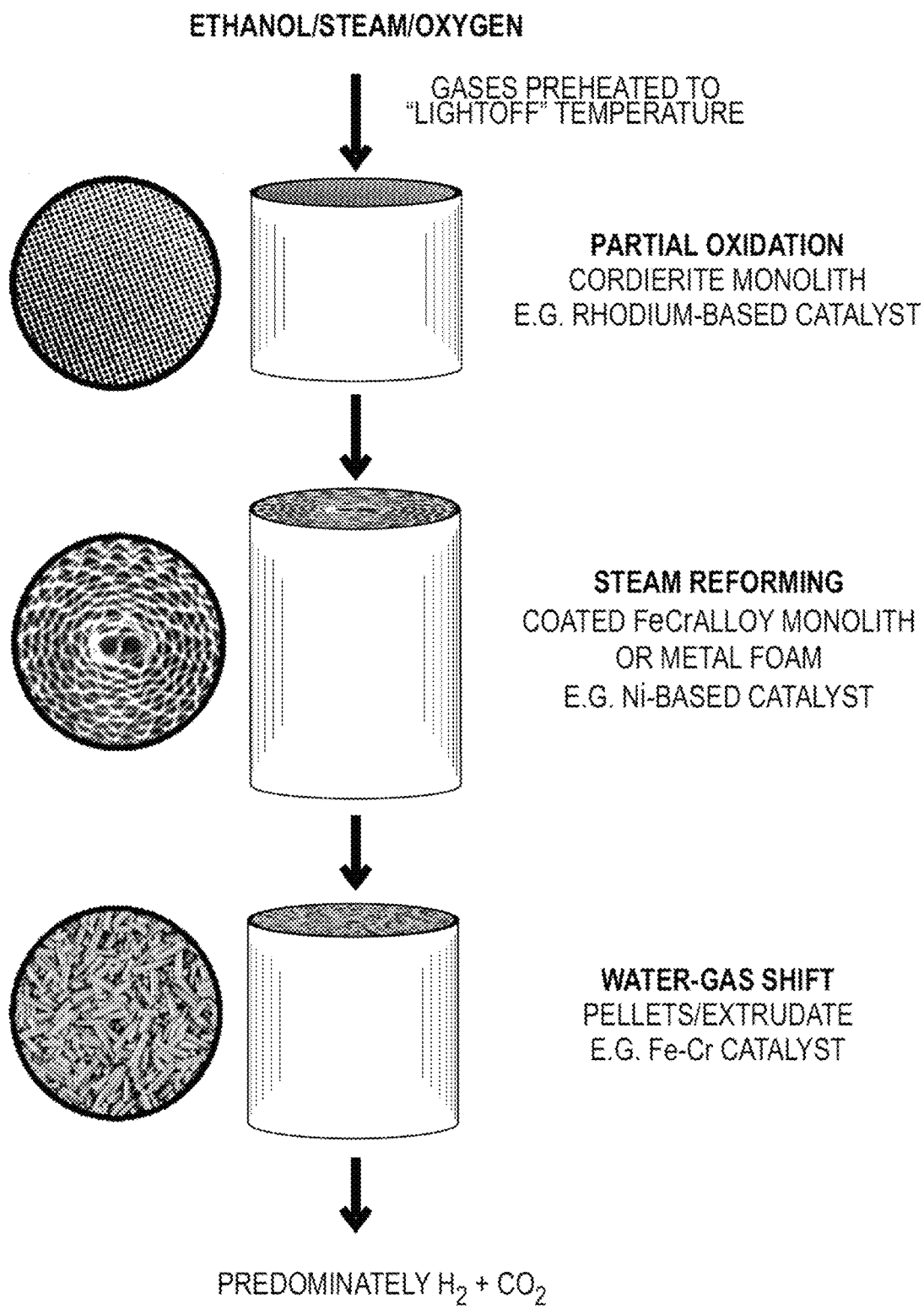
FIG. 4 a schematic representation of reactor internals showing an illustrative arrangement for minimizing pressure drop and/or facilitating heat transfer from one catalyst bed to the next in a segmented adiabatic reactor according to another embodiment of the present disclosure.

FIG. 4 is a schematic representation of reactor internals showing an illustrative arrangement for minimizing pressure drop and/or facilitating heat transfer from one catalyst bed to the next in a segmented adiabatic reactor according to another embodiment of the present disclosure.

The segmented reactor components depicted in FIG. 4 include a partial oxidation segment, which may comprise a high temperature resistant support for the partial oxidation catalyst, such as a monolith formed of cordierite, alumina, iron-chromium alloy (e.g., FeCralloy, commercially available from Goodfellow Corporation, Coraopolis, PA), or other suitable monolith or support material of construction, or extrudates, or pellets or spheres of such support material, or mixtures thereof, having a partial oxidation catalyst, e.g., a rhodium-based catalyst, or other suitable partial oxidation catalyst, on and/or in the monolith, extrudates, pellets, spheres, etc. The catalyst may for example be deposited in the porosity of the support, or otherwise incorporated in the support, in any suitable manner, such as by vapor deposition, solution impregnation, or other appropriate technique. The partial oxidation segment thus is arranged to receive the fuel (e.g., ethanol or other hydrocarbons or other feedstock), steam, and oxygen feed, with the gases preheated to "light off" temperature.

Following the partial oxidation segment, the steam reforming segment as the next segment may comprise a high temperature resistant support for the steam reforming catalyst, such as a catalyst-coated metal alloy monolith, or extrudates, pellets, spheres, or mixtures thereof formed of cordierite, alumina, iron-chromium alloy (e.g., FeCr alloy, commercially available from Goodfellow Corporation, Coraopolis, PA), as a support for the steam reforming catalyst. The steam reforming segment may for example comprise a FeCr alloy monolith, having a nickel-based catalyst, or other suitable steam reforming catalyst, in and/or on the support. The steam reforming catalyst may be incorporated on and/or in the support by any suitable deposition, coating, or impregnation techniques.

Downstream from the steam reforming segment is the water gas shift segment as the next segment. The water gas shift segment may for example comprise a bed of pellets or extrudates of suitable support material containing catalyst such as Fe—Cr catalyst on and/or in such support. The catalyst may be incorporated in the support material feedstock, by blending or mixing therein prior to the pelletizing or extrusion processing of the feedstock, or in other suitable manner such as vapor deposition, solution impregnation, or other incorporation techniques.

The respective segmented reactor components in the foregoing description are of an illustrative character, and it is to be appreciated that other components, supports, substrates, catalysts, and arrangements may be variously employed in other embodiments of the present disclosure. The segmented components may be positioned and interfaced in the adiabatic reactor as appropriate to facilitate heat transfer through such reactor and to provide acceptable pressure drop for the gases flowing through the reactor from the reactor inlet upstream of the partial oxidation segment to the reactor outlet downstream of the water gas shift segment.

The unitary adiabatic reactor utilized in the hydrogen generation systems and processes of the present disclosure in various embodiments may be configured, constructed, and arranged to conduct (i) only partial oxidation and steam reforming reactions therein, or (ii) partial oxidation, steam reforming, and high temperature water shift gas reactions therein, or (iii) partial oxidation, steam reforming, high temperature water gas shift, and the low temperature water gas shift reactions therein, as may be desirable or otherwise appropriate in specific implementations of the systems and processes of the present disclosure.

Although the unitary adiabatic reactor is described in various embodiments herein as containing separate (segmented) beds of catalyst, wherein the catalyst in each separate bed is of a different type, to carry out a specific one of the respective reactions conducted in the reactor, the disclosure also contemplates configurations and arrangements in which catalysts for conducting different ones of the respective reactions are in mixture with one another. For example, the unitary adiabatic reactor may contain a mixture of partial oxidation catalyst and steam reforming catalyst as a corresponding single bed in the reactor, upstream of a water gas shift reaction catalyst bed in the reactor. As another example, the unitary adiabatic reactor may contain a mixture of partial oxidation catalyst, steam reforming catalyst, and high temperature water gas shift reaction catalyst as a corresponding single bed in the reactor, which may optionally be followed by a low temperature water gas shift reaction catalyst bed in the reactor if low temperature water gas shift reaction is to be carried out in the unitary adiabatic reactor. The disclosure contemplates the provision of mixtures of the respective catalysts in which the respective catalysts are homogeneously mixed with one another, as well as the provision of mixtures in which the respective catalysts are heterogeneously mixed with gradients of concentration in the unitary adiabatic reactor.

The unitary adiabatic reactor may be constituted with internal thermal management components or features therein to facilitate or assist the respective reactions conducted in the unitary adiabatic reactor to be carried out at appropriate conditions. Such components and features may be of any suitable type, and may for example comprise ceramic balls that are localized in the reactor vessel or that are dispersed in one or more of the catalyst beds to buffer or effectuate heat flows, or heat transfer rods, finned structures, or other heat transfer elements.

In a specific illustrative example, the unitary adiabatic reactor may be configured, constructed, and arranged to contain (i) a bed of suitable partial oxidation catalyst such as a rhodium-substituted pyrochlore catalyst, downstream of which is (ii) a bed of nickel-based reforming catalyst.

In addition to the feedstock-flexible character of hydrogen generation systems of the present disclosure, as earlier described herein, the hydrogen generation systems of the disclosure may be arranged and operated to effectively "turn up" or "turn down" the non-autothermal oxidative reforming system and electrolysis system so as to optimize the hydrogen production from each unit based on current pricing of feedstocks (bioethanol, biomethanol, biodiesel, biomethane, etc.) and current electricity prices. In this regard, the generation of green hydrogen from renewable energy is associated with variable electricity prices. For example, the hydrogen generation system may be constructed so as to be readily reset, when high-grade ethanol feedstock is replaced with low-grade ethanol or other biofuels. As a further example, the hydrogen generation system may be flexibly arranged to accommodate alternate uses for heat that is generated in the operation of the overall system.

It will therefore be appreciated that the hydrogen generation systems of the present disclosure may be flexibly constructed and arranged to accommodate a variety of different potentially available feedstocks, that high thermal efficiencies can be achieved since combustion of feedstock for steam reforming is not required, and that substantially simplified design and operation can be achieved by reduction of vessels, piping, valves, heat exchangers, etc.

The present disclosure thus provides a hydrogen generation system that advantageously integrates a water electrolysis system with a non-autothermal oxidative reforming system to enable low-cost generation of green hydrogen to be achieved. The hydrogen generation system permits the oxygen generated as a byproduct of the water electrolysis reaction to be utilized in a non-autothermal oxidative reforming system processing ethanol or other biosourced feedstock, so that the coupled non-autothermal oxidative reforming and electrolysis systems are able to generate green hydrogen in a highly cost-effective manner. Such coupled non-autothermal oxidative reforming and electrolysis systems can be flexibly operated in a variety of modes that selectively maximize either the non-autothermal oxidative reforming or the electrolysis system depending on costs of feedstocks and electricity. The coupled non-autothermal oxidative reforming and electrolysis systems of the disclosure produce low-cost green hydrogen that can be used in fuel cells to produce electricity in a clean and highly efficient manner, with water as the only byproduct. The green hydrogen may be used in fuel cells of various types, e.g., PEM fuel cells, and may be used in a wide variety of end-use applications, such as hydrogen combustion engines.

The present disclosure correspondingly provides, in a variety of flexibly configured implementations, a coupled hydrogen generation system, comprising a water electrolyzer, and a non-autothermal catalytic oxidative reforming reactor arranged to receive oxygen from the water electrolyzer. The disclosure additionally provides, in a variety of flexibly implemented forms, a hydrogen generation process, comprising: (i) electrolyzing water to generate hydrogen and oxygen, and (ii) utilizing the oxygen from the electrolyzing to conduct a non-autothermal oxidative reforming reaction.

The respective electrolysis and non-autothermal oxidative reforming in such systems and processes can be arranged to operate at any suitable pressure conditions, including atmospheric, superatmospheric, and subatmospheric conditions, and can be arranged to match up the electrolysis and non-autothermal oxidative reforming operations to accommodate variable energy supply conditions, variable temperature conditions, and variable feedstock conditions. The oxygen generated in the electrolysis operation can, in addition to supplying the non-autothermal oxidative reforming operation, be exported from the process system to another, or other oxygen-using processes or systems. The non-autothermal oxidative reforming operation can be coupled with carbon capture or carbon sequestration systems and processes, to provide environmental operation credits, e.g., carbon emission credits or other operational advantages.

In various embodiments, the electrolysis may be carried out continuously, intermittently, or in other modulated fashion to accommodate variation in electricity costs, operating optimally when electricity is cheapest. The hydrogen generated in the electrolysis may be utilized for generation of electricity, which then may be transmitted to electrical storage, such as large scale battery installations for buffering of subsequent electricity needs of the electrolysis operation.

Figure 5:
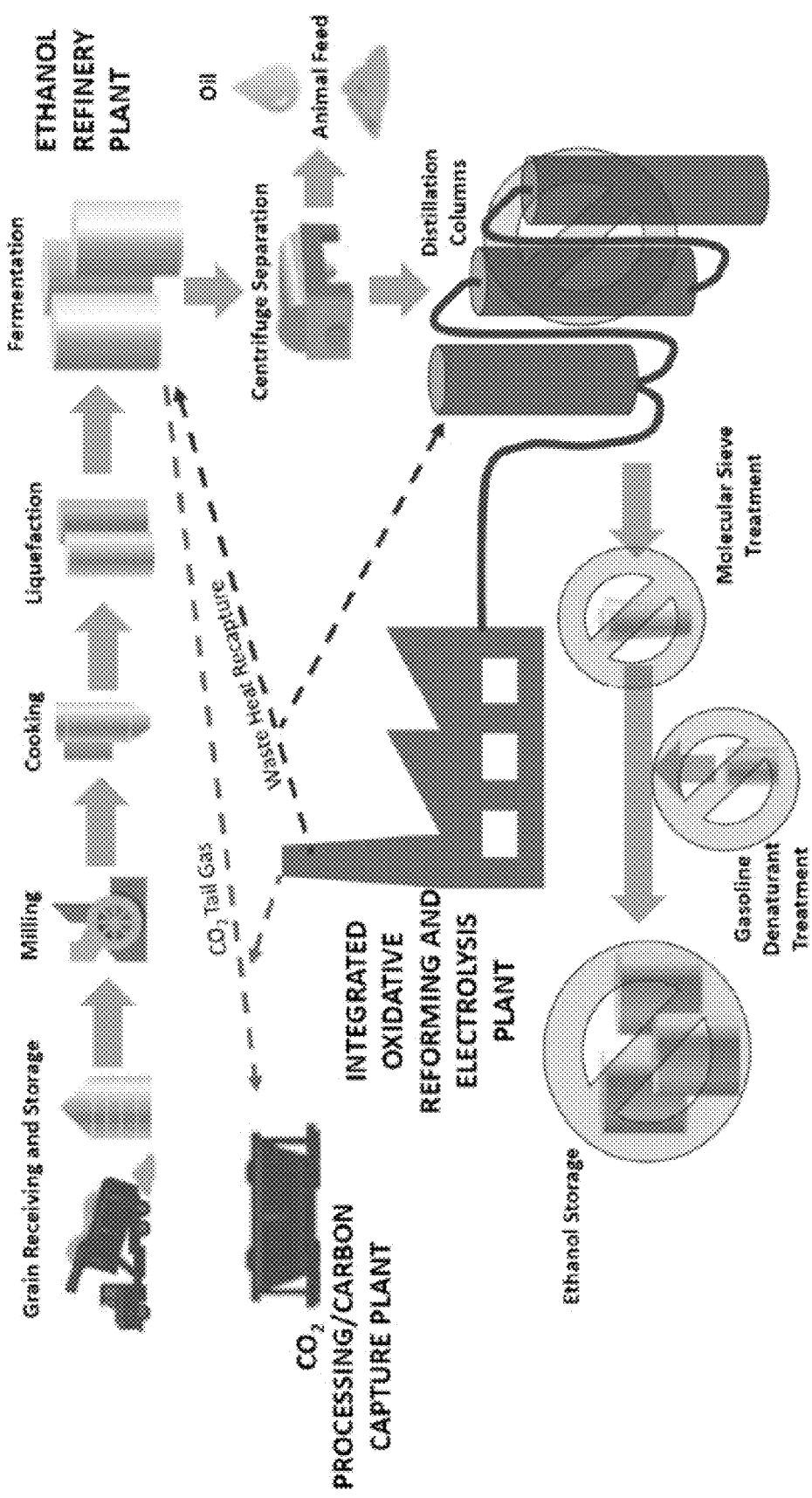
FIG. 5 is a schematic illustration of a hydrogen generation system including an integrated oxidative reforming and electrolysis plant as further integrated with an ethanol refinery and a $CO_2$ processing or carbon capture system, according to another embodiment of the disclosure.

FIG. 5 is a schematic illustration of a hydrogen generation system including an integrated oxidative reforming and electrolysis plant, as further integrated with an ethanol refinery and a $CO_2$ processing or carbon capture system, according to another embodiment of the disclosure.

An ethanol refinery produces ethanol as a fermentation product from a fermentable feedstock. The fermentable feedstock may be a plant material that contains sugars enabling the fermentation to produce ethanol, or other starch-and sugar-based feedstocks such as sugar cane and sugar beets, or cellulosic feedstocks comprising cellulose, hemicellulose, and lignin. Various grain materials may be employed as feedstocks for the ethanol refinery, such as corn, rye, and wheat. Corn is a very commonly used feedstock for ethanol production, and ethanol refineries using corn as a fermentable feedstock currently supply large quantities of ethanol for use as a gasoline additive, and for use in an extensive range of consumer products.

FIG. 5 in the schematic depiction of the ethanol refinery shows ethanol refinery components that may be conventionally present in an ethanol refinery, but that are eliminated in the integration of the ethanol refinery with the integrated oxidative reforming and electrolysis system of the present disclosure.

Specifically, such eliminated components include downstream distillation columns that are rendered unnecessary by the direct use in the oxidative reduction system of dilute ethanol-water mixture distillate fractions obtained from upstream initial distillation. In such manner, a simplified, truncated distillation unit can be employed.

Additional components of the conventional ethanol refinery that are eliminated in the further integration of the oxidative reforming and electrolysis hydrogen generation system with the ethanol refinery include (i) the molecular sieve treatment unit that is utilized to remove water, which may for example be present at a level on the order of 5 vol % in the ethanol produced by the conventional distillation equipment, (ii) the gasoline denaturant treatment that is utilized for compliance with regulatory requirements for ethanol use as a gasoline additive, or treatment of ethanol with other denaturants for ethanol use in other applications such as hand sanitizers, camp stove fuels, perfumes, etc., and (iii) the ethanol storage facilities conventionally utilized for high-volume retention of product ethanol at the ethanol refinery.

Thus, the further integration of the oxidative reforming and electrolysis hydrogen generation system of the present disclosure with the substantially smaller and simplified ethanol refinery achieves a major reduction of the ethanol refinery footprint, and corresponding reduction in the capital equipment and operating costs of the ethanol refinery.

The ethanol refinery as simplified in such manner may comprise the illustrated components shown in the FIG. 5 embodiment, of initial grain receiving and storage facilities, in which corn or other feedstock delivered to the ethanol refinery plant is placed in storage silos or other containers, from which it is transferred to a milling unit. The milled feedstock then is passed to a cooking unit, with the cooking product then being introduced to a liquefaction unit in which the cooked material is subjected to partial hydrolysis to reduce its viscosity for the subsequent fermentation in the fermentation unit. The feedstock slurry from the liquefaction unit passed to the fermentation unit then undergoes fermentation under controlled temperature and pressure conditions, with the fermentate from the fermentation unit then passing to the centrifuge separation unit, e.g., for separation of oil and solids that are used for animal feed or other products, and recovery of an ethanol-water solution that then is passed to the distillation unit.

In the distillation unit, the ethanol-water solution is distilled to reduce its water content and the resulting water-reduced ethanol-water solution which may for example contain 40-50 vol % water then is flowed to the integrated oxidative reforming and electrolysis plant as a feedstock for the oxidative reforming operation including partial oxidation, steam reforming, and water gas shift reaction in the unitary adiabatic reactor of the oxidative reforming system.

The ethanol refinery in the fermentation operation produces a $CO_2$ tail gas, and such $CO_2$ tail gas may be flowed together with CO₂ tail gas of the integrated oxidative reforming and electrolysis system to a CO₂ processing or carbon capture plant. The CO₂ processing or carbon capture plant may be arranged for packaging of CO₂ as a carbonation gas or chemical synthesis reactant, or for delivery of CO₂ to pipeline or transport facilities, e.g., tank truck, rail, barge, marine shipping, aircraft, or other motive transport facilities, or for carbon capture processing of the CO₂ to effect carbon sequestration or remediation.

In such further integrated oxidative reforming and electrolysis system and ethanol refinery, the oxidative reforming and electrolysis plant may be operated so that waste heat generated in the oxidative reforming or electrolysis operations is exported to the fermentation unit and/or to the distillation unit so that the overall integrated facility is thermally managed in a highly efficient manner.

The above-described further integration of the integrated oxidative reforming and electrolysis system with an ethanol refinery achieves a highly advantageous production of hydrogen gas that leverages existing ethanol refinery infrastructure and simplifies new ethanol refinery construction and operation, particularly when the integrated oxidative reforming and electrolysis system is co-located with the ethanol refinery, e.g., at a stationary geographic site installation with separation distance between the ethanol refinery and integrated oxidative reforming and electrolysis system being of a same or similar distance as the previously described separation distance between co-located electrolyzer and non-autothermal oxidative reforming system facilities.

Thus, the integrated oxidative reforming and electrolysis system and the ethanol refinery may for example be geographically situated so that they are co-located, e.g., with a separation distance between the ethanol refinery and the oxidative reforming and electrolysis system that is less than at least one of 10 km, 8 km, 6 km, 5 km, 4 km, 3 km, 2.5 km, 2.4 km, 2.3 km, 2.2 km, 2.1 km, 2.0 km, 1.9 km, 1.8 km, 1.7 km, 1.6 km, 1.5 km, 1.4 km, 1.3 km, 1.2 km, 1.1 km, 1.0 km, 0.9 km, 0.8 km, 0.7 km, 0.6 km, 0.5 km, 0.4 km, 0.3 km, 0.2 km, 0.1 km, 0.05 km, 0.025 km, 0.005 km, and 0.001 km, although the disclosure is not limited thereto, and the ethanol refinery and the oxidative reforming and electrolysis system may be integrated with one another at any other suitable separation distances, and may even be sited remotely from one another at vast distances while being integrated in the manner of the present disclosure, such as by flow circuitry, pipelines, and other integration infrastructure.

As a specific example of an integrated oxidative reforming and electrolysis system, as further integrated with an ethanol refinery in a 31,250 kg $H_2$/day hydrogen generation system including a 10.5 MW low temperature electrolyzer and non-autothermal ethanol oxidative reformer operating at $x=0.40$ (reaction (1)), integrated with a 40,000 gallon/day ethanol refinery, with all of the ethanol production of the ethanol refinery being dedicated to production of hydrogen in the further integrated system, Table 3 below sets out a tabulation of operational inputs and outputs for such further integrated hydrogen generation system.

TABLE 3

Operational Inputs and Outputs of
31,250 kg $H_2$/Day Hydrogen Generation System

| Inputs | Outputs |
|---|---|
| 10.5 MW Low Temperature Electrolyzer | |
| 37,500 kg $H_2O$/day | 4,170 kg $H_2$/day |
| 232 MWh/day (at 55.7 kWh/kilogram $H_2$) | 33,330 kg $O_2$/day |

TABLE 3-continued

Operational Inputs and Outputs of
31,250 kg $H_2$/Day Hydrogen Generation System

| Inputs | Outputs |
|---|---|
| Non-Autothermal Ethanol Oxidative Reformer, Operating at x = 0.40 (reaction (1)) | |
| 120,000 kg ethanol/day (40,000 gallons/day) | 27,080 kg $H_2$/day |
| 103,125 kg $H_2O$/day (12,500 gallons/day) | 230,000 kg $CO_2$/day |
| 33,330 kg $O_2$/day | |

The further integration of the integrated oxidative reforming and electrolysis system with an ethanol refinery thus provides a variety of potential benefits in the construction and operation of the ethanol refinery, as well as synergy between the ethanol refinery and the integrated oxidative reforming and electrolysis system. Specifically, such further integration (i) obviates the need for a full conventional distillation assembly since the oxidative reforming and electrolysis system is operated with dilute ethanol feed produced by the ethanol refinery, (ii) enables CO₂ tail gas from the oxidative reforming and electrolysis system to be processed by CO₂ storage and transport facilities at the ethanol refinery, or alternatively CO₂ capture facilities at the ethanol refinery, that are provided for processing of the CO₂ tail gas from the ethanol refinery, or to effect carbon capture of such tail gas from the ethanol refinery, (iii) eliminates the molecular sieve, denaturant addition, and ethanol storage otherwise required at the ethanol refinery, and (iv) enables byproduct heat from the integrated oxidative reforming and electrolysis system to be beneficially employed in the fermentation and distillation operations conducted in the ethanol refinery.

Accordingly, the present disclosure contemplates a further integrated system, in which an ethanol refinery is integrated with the hydrogen generation system of the disclosure, wherein the ethanol refinery produces ethanol as a fermentation product from a fermentable feedstock, e.g., corn or other plant or feedstock material, and the ethanol produced by the ethanol refinery comprises at least part of the feedstock fuel for the non-autothermal oxidative reforming system.

The present disclosure additionally contemplates a further integrated system, in which the ethanol refinery and hydrogen generation system are further integrated with a CO₂ processing or carbon capture system, with the CO₂ processing or carbon capture system being arranged to receive CO₂ gas from each of the ethanol refinery and the hydrogen generation system.

It will therefore be appreciated that the electrolysis and non-autothermal oxidative reforming may be integrated in various ways and in various arrangements for green hydrogen generation, within the broad scope of the present disclosure, and that the electrolysis and non-autothermal oxidative reforming may be co-located with one another and with other processes and apparatus, to achieve hydrogen generation, oxygen generation, non-autothermal oxidative reforming, electricity generation, biomass conversion, CO₂ generation, and various other operations, in an efficient, cost-effective, and environmentally benign manner.

In the practice of the present disclosure, a preferred implementation of the process of the present disclosure, in various embodiments, may be constituted as a hydrogen generation process, comprising: electrolyzing water to generate hydrogen and oxygen; and non-autothermally catalytically oxidatively reforming a feedstock fuel with said oxygen and with water to generate hydrogen, wherein the feedstock fuel comprises fuel selected from the group consisting of oxygenates, hydrocarbons, and mixtures thereof, wherein the feedstock fuel has a bio-derived content of up to 100% by volume, based on total volume of the feedstock fuel, e.g., in a range of from 5% to 100% by volume, based on total volume of the feedstock fuel, and wherein the reforming is conducted in a unitary adiabatic reactor to which the hydrocarbon feedstock fuel, oxygen, and water are introduced, and from which the generated hydrogen is discharged, the unitary adiabatic reactor containing successive catalyst beds contacted in sequence in flow through the reactor, including (i) a first catalyst bed comprising a partial oxidation catalyst, (ii) a second catalyst bed comprising steam reforming catalyst, (iii) a third catalyst bed comprising a high temperature water gas shift catalyst, and optionally (iv) a fourth catalyst bed comprising a low temperature water gas shift catalyst. Such preferred process implementation may further embody or incorporate any one or more compatible features (1)-(12) of:

(1) the bio-derived content of the feedstock fuel is up to 100% by volume of the feedstock fuel, e.g., being in a range in which the lower end point value is 1%, 2%, 3%, 4%, 5%, 8%, 10%, 12%, 15%, 18%, 20%, 25%, 30%, 35%, 40%, 45%, 50%, 55%, 60%, 65%, 70%, 75%, 80%, 85%, 90%, 95%, 98%, or up to 100%, by volume, based on total volume of the feedstock fuel, and in which the upper end point value is one of the foregoing numeric values exceeding the lower end point value and up to and including the value of 100% by volume;

(2) the feedstock fuel comprising a biologically produced hydrocarbon;

(3) the feedstock fuel comprising a biologically produced oxygenate;

(4) the feedstock fuel comprising ethanol;

(5) the electrolyzing being carried out in an electrolyzer selected from the group consisting of polymer electrolyte membrane electrolyzers, alkaline electrolyzers, and solid oxide electrolyzers;

(6) the partial oxidation catalyst in the first catalyst bed comprising a rhenium catalyst, the steam reforming catalyst in the second catalyst bed comprising a promoted nickel catalyst, the high temperature water gas shift catalyst in the third catalyst bed comprising a copper-promoted iron catalyst, and the low temperature water shift gas catalyst in the optional fourth catalyst bed when present in the unitary adiabatic reactor comprising copper/zinc coated monolith catalyst, and when the optional fourth catalyst bed is not present in the unitary adiabatic reactor, it is present in a low temperature water gas shift reactor external to the unitary adiabatic reactor, and comprises the copper/zinc coated monolith catalyst;

(7) partial oxidation reaction being carried out in the first catalyst bed at temperature in a range of from about 700° C. to about 900° C., steam reforming reaction being carried out in the second catalyst bed at temperature in a range of from about 400° C. to about 850° C., high temperature water gas shift reaction being carried out in the third catalyst bed at temperature in a range of from about 300° C. to about 450° C., and low temperature water gas shift reaction being carried out in the optional fourth catalyst bed when present in the unitary adiabatic reactor, or otherwise when the optional fourth catalyst bed is not present in the unitary adiabatic reactor, but is present in a low temperature water gas shift reactor external to the unitary adiabatic reactor, at temperature in a range of from about 150° C. to about 350° C.;

(8) the reforming comprising performance of the reaction $C_2H_5OH+(3-2x)H_2O+xO_2 \rightarrow (6-2x)H_2+2CO_2$ wherein $0<x<1.5$, or in a further specific embodiment wherein $0.30<x<0.50$, or wherein x is in another suitable range of values, e.g., $0.10 \leq x \leq 1.1$; $0.3 \leq x \leq 0.9$; $0.3 \leq x \leq 0.5$; or $0.75 \leq x \leq 0.85$; or x may for example be about 0.4, 0.5, 0.65, 0.80, 1.0, or other suitable value;

(9) the generated hydrogen discharged from the reactor being in a discharged gas stream at a concentration of at least 60 mol %;

(10) the reforming being thermally neutral and the electrolyzing providing all oxygen required by the reforming;

(11) the electrolyzing being carried out in a solid oxide electrolyzer, wherein the reforming is conducted to generate excess heat, and wherein the excess heat generated by the reforming is transferred to the solid oxide electrolyzer so that the solid oxide electrolyzer operates at thermal efficiency greater than 50%; and

(12) the optional fourth catalyst bed not being present in the unitary adiabatic reactor, and being present in a low temperature water gas shift reactor external to the unitary adiabatic reactor.

In the practice of the present disclosure, a preferred implementation of the system of the present disclosure, in various embodiments, may be constituted as a hydrogen generation system, comprising: an electrolyzer arranged to receive water and to generate hydrogen and oxygen therefrom; and a non-autothermal oxidative reforming system comprising a unitary adiabatic reactor arranged to receive oxygen from the electrolyzer, feedstock fuel from a feedstock fuel source, and water from a water source, the reactor containing successive catalyst beds that are contacted in sequence in flow through the reactor, including (i) a first catalyst bed comprising a partial oxidation catalyst, (ii) a second catalyst bed comprising steam reforming catalyst, (iii) a third catalyst bed comprising a high temperature water gas shift catalyst, and optionally (iv) a fourth catalyst bed comprising a lower temperature water gas shift catalyst, so that feedstock fuel from the feedstock fuel source with the oxygen from the electrolyzer and water is catalytically oxidatively reformed in the reactor to generate hydrogen, the reactor being arranged to discharge the generated hydrogen, wherein the feedstock fuel source is arranged to supply feedstock fuel comprising fuel selected from the group consisting of oxygenates, hydrocarbons, and mixtures thereof, the feedstock fuel having a bio-derived content in a range of from 5% to 100% by volume, based on total volume of the feedstock fuel. Such preferred system implementation may further embody or incorporate any one or more compatible features (1)-(13) of:

(1) the feedstock fuel source comprising a supply vessel, flow circuitry, or reservoir containing the feedstock fuel;

(2) the electrolyzer and the non-autothermal oxidative reforming system being co-located at a stationary geographic site installation, e.g., with a separation distance between them that is less than at least one of 10 km, 8 km, 6 km, 5 km, 4 km, 3 km, 2.5 km, 2.4 km, 2.3 km, 2.2 km, 2.1 km, 2.0 km, 1.9 km, 1.8 km, 1.7 km, 1.6 km, 1.5 km, 1.4 km, 1.3 km, 1.2 km, 1.1 km, 1.0 km, 0.9 km, 0.8 km, 0.7 km, 0.6 km, 0.5 km, 0.4 km, 0.3 km, 0.2 km, 0.1 km, 0.05 km, 0.025 km, 0.005 km, and 0.001 km;

(3) the hydrogen generation system being of modular form mounted on a skid or in a commercial container for transport to and installation at a hydrogen production site, the system being constituted to produce hydrogen at a rate in a range of 100-2000 kg hydrogen/day;

(4) the feedstock fuel in the feedstock fuel source having a bio-derived content of up to 100% by volume of the feedstock fuel, e.g., being in a range in which the lower end point value is 1%, 2%, 3%, 4%, 5%, 8%, 10%, 12%, 15%, 18%, 20%, 25%, 30%, 35%, 40%, 45%, 50%, 55%, 60%, 65%, 70%, 75%, 80%, 85%, 90%, 95%, 98%, or up to 100%, by volume, based on total volume of the feedstock fuel, and in which the upper end point value is one of the foregoing numeric values exceeding the lower end point value and up to and including the value of 100% by volume;

(5) the optional fourth catalyst bed not being present in the unitary adiabatic reactor, and being present in a low temperature water gas shift reactor external to the unitary adiabatic reactor in the hydrogen generation system;

(6) the feedstock fuel in the feedstock fuel source comprising a biologically produced hydrocarbon or a biologically produced oxygenate;

(7) the feedstock fuel in the feedstock fuel source comprising ethanol;

(8) the electrolyzer comprising an electrolyzer selected from the group consisting of polymer electrolyte membrane electrolyzers, alkaline electrolyzers, and solid oxide electrolyzers;

(9) the partial oxidation catalyst in the first catalyst bed comprising a rhenium catalyst, the steam reforming catalyst in the second catalyst bed comprising a promoted nickel catalyst, the high temperature water gas shift catalyst in the third catalyst bed comprising a copper-promoted iron catalyst, and the low temperature water shift gas catalyst in the optional fourth catalyst bed when present comprising copper/zinc coated monolith catalyst, and when the optional fourth catalyst bed is not present in the unitary adiabatic reactor, it is present in a low temperature water gas shift reactor external to the unitary adiabatic reactor, and comprises the copper/zinc coated monolith catalyst;

(10) the hydrogen generation system comprising a process controller arranged to control temperature in the reactor so that partial oxidation reaction is carried out in the first catalyst bed at temperature in a range of from about 700° C. to about 900° C., steam reforming reaction is carried out in the second catalyst bed at temperature in a range of from about 400° C. to about 850° C. high temperature water gas shift reaction is carried out in the third catalyst bed at temperature in a range of from about 300° C. to about 450° C., and low temperature water gas shift reaction is carried out in the optional fourth catalyst bed when present in the unitary adiabatic reactor, or otherwise when the optional fourth catalyst bed is not present in the unitary adiabatic reactor, but is present in a low temperature water gas shift reactor external to the unitary adiabatic reactor, at temperature in a range of from about 150° C. to about 350° C.;

(11) the reactor being of vertically elongate form, arranged for down flow of gas therethrough, with the first catalyst bed at an uppermost position in the successive catalyst beds, overlying the second catalyst bed, which in turn overlies the third catalyst bed, which in turn overlies the optional fourth catalyst bed when present, with the optional fourth catalyst bed when present being at a lowermost position in the successive catalyst beds, preferably wherein the successive catalyst beds in the reactor are separated from one another by physical separation elements or structure;

(12) the feedstock fuel in the feedstock fuel source comprising ethanol, and the hydrogen generation system further comprising a process controller arranged to coordinate operation of the electrolyzer and non-autothermal oxidative reforming system so that the non-autothermal oxidative reforming system carries out the reaction $C_2H_5OH+(3-2x)H_2O+xO_2 \rightarrow (6-2x)H_2+2CO_2$ wherein $0<x<1.5$, or in a further specific embodiment wherein $0.30<x<0.50$, or wherein x is in another suitable range of values, e.g., $0.10 \leq x \leq 1.1$; $0.3 \leq x \leq 0.9$; $0.3 \leq x \leq 0.5$; or $0.75 \leq x \leq 0.85$; or x may for example be about 0.4, 0.5, 0.65, 0.80, 1.0, or other suitable value;

(13) the electrolyzer being a solid oxide electrolyzer, and the hydrogen generation system further comprising a process controller arranged to coordinate operation of the electrolyzer and non-autothermal oxidative reforming system so that the non-autothermal oxidative reforming system generates excess heat for transfer to the solid oxide electrolyzer so that the solid oxide electrolyzer operates at thermal efficiency greater than 50%.

In one specific embodiment (referred to hereinafter as "Embodiment I"), the disclosure relates to a thermally integrated hydrogen generation system, comprising: (A) an electrolyzer arranged to receive water and to generate hydrogen gas and oxygen gas therefrom; (B) an oxygen storage vessel, arranged to receive the oxygen gas from the electrolyzer; (C) a non-autothermal oxidative reforming system comprising a unitary adiabatic reactor arranged to receive oxygen gas from the oxygen storage vessel, feedstock fuel from a feedstock fuel source containing the feedstock fuel, and water from a water source, the unitary adiabatic reactor containing successive catalyst beds that are contacted in sequence in flow through the unitary adiabatic reactor, including (i) a first catalyst bed comprising a partial oxidation catalyst, (ii) a second catalyst bed comprising steam reforming catalyst, and (iii) a third catalyst bed comprising a high temperature water gas shift catalyst, so that the feedstock fuel from the feedstock fuel source with the oxygen from the oxygen storage vessel and the water from the water source is catalytically oxidatively reformed in the unitary adiabatic reactor to generate oxidatively reformed gas that is predominantly hydrogen, the unitary adiabatic reactor being arranged to discharge the generated oxidatively reformed gas, (D) a first heat exchanger arranged to receive the generated oxidatively reformed gas from the unitary adiabatic reactor and remove heat therefrom, to produce a reduced temperature oxidatively reformed gas; (E) a low temperature water gas shift reactor arranged to receive the reduced temperature oxidatively reformed gas from the first heat exchanger and convert at least a portion of carbon monoxide in the reduced temperature oxidatively reformed gas to carbon dioxide, to produce a low temperature water gas shift reaction gas of reduced carbon monoxide content, the low temperature water gas shift reactor including a fourth catalyst bed comprising a low temperature water gas shift catalyst; (F) a hydrogen gas purifier arranged to receive the low temperature water gas shift reaction gas of reduced carbon monoxide content from the low temperature water gas shift reactor, and to produce a separated hydrogen gas, and waste gas containing CO, $CO_2$, methane, and unrecovered (residual) hydrogen; (G) a hydrogen gas reservoir, arranged to receive the hydrogen gas from the electrolyzer and the separated hydrogen gas from the hydrogen gas purifier; (H) a burner arranged to combust the waste gas produced by the hydrogen gas purifier, to yield a flue gas; (I) a second heat exchanger arranged to receive the flue gas from the burner for heating of the oxygen gas from the oxygen storage vessel, the feedstock fuel from the feedstock fuel source, and the water from the water source prior to their introduction to the unitary adiabatic reactor; and (J) a process controller configured and arranged to coordinate operation of the electrolyzer and the non-autothermal oxidative reforming system in the thermally integrated hydrogen generation system, and adjust throughput of each of the electrolyzer and the non-autothermal oxidative reforming system to control temperature in the unitary adiabatic reactor, wherein the feedstock fuel contained in the feedstock fuel source comprises fuel selected from the group consisting of oxygenates, hydrocarbons, and mixtures thereof, the feedstock fuel having a bio-derived content of up to 100% by volume of the feedstock fuel, e.g., in a range of from 1% to 100% by volume, based on total volume of the feedstock fuel.

Embodiment I may be implemented with any one or more of the following compatible features: (1) the feedstock fuel source comprising a supply vessel, flow circuitry, or reservoir containing the feedstock fuel; (2) the electrolyzer and the non-autothermal oxidative reforming system being co-located at a stationary geographic site installation, e.g., with a separation distance between them that is less than at least one of 10 km, 8 km, 6 km, 5 km, 4 km, 3 km, 2.5 km, 2.4 km. 2.3 km, 2.2 km, 2.1 km, 2.0 km, 1.9 km, 1.8 km, 1.7 km, 1.6 km, 1.5 km, 1.4 km, 1.3 km, 1.2 km, 1.1 km, 1.0 km, 0.9 km, 0.8 km, 0.7 km, 0.6 km, 0.5 km, 0.4 km, 0.3 km, 0.2 km, 0.1 km, 0.05 km, 0.025 km, 0.005 km, and 0.001 km; (3) the hydrogen generation system being of modular form mounted on a skid or in a commercial container for transport to and installation at a hydrogen production site, the system being constituted to produce hydrogen at a rate in a range of 100-2000 kg hydrogen/day; (4) the feedstock fuel contained in the feedstock fuel source having a bio-derived content of up to 100% by volume of the feedstock fuel, e.g., being in a range in which the lower end point value is 1%, 2%, 3%, 4%, 5%, 8%, 10%, 12%, 15%, 18%, 20%, 25%, 30%, 35%, 40%, 45%, 50%, 55%, 60%, 65%, 70%, 75%, 80%, 85%, 90%, 95%, 98%, or up to 100%, by volume, based on volume of the feedstock fuel, and in which the upper end point value is one of the foregoing numeric values exceeding the lower end point value and up to and including the value of 100% by volume; (5) the process controller being configured and arranged to adjust throughput of each of the electrolyzer and the non-autothermal oxidative reforming system in response to variability of the feedstock fuel and variability of electricity costs; (6) the feedstock fuel contained in the feedstock fuel source comprising a biologically produced hydrocarbon or a biologically produced oxygenate; (7) the feedstock fuel contained in the feedstock fuel source comprising ethanol; (8) the electrolyzer comprising an electrolyzer selected from the group consisting of polymer electrolyte membrane electrolyzers, alkaline electrolyzers, and solid oxide electrolyzers; (9) the partial oxidation catalyst in the first catalyst bed comprising a rhodium catalyst, the steam reforming catalyst in the second catalyst bed comprising a promoted nickel catalyst, the high temperature water gas shift catalyst in the third catalyst bed comprising a copper-promoted iron catalyst, and the low temperature water shift gas catalyst in the fourth catalyst bed comprising copper/zinc coated monolith catalyst; (10) the process controller being configured and arranged to control temperature in the unitary adiabatic reactor so that partial oxidation reaction is carried out in the first catalyst bed at temperature in a range of from about 700° C. to about 900° C., steam reforming reaction is carried out in the second catalyst bed at temperature in a range of from about 450° C. to about 850° C., high temperature water gas shift reaction is carried out in the third catalyst bed at temperature in a range of from about 300° C. to about 450° C., and low temperature water gas shift reaction is carried out in the fourth catalyst bed at temperature in a range of from about 150° C. to about 350° C.; (11) the unitary adiabatic reactor being of vertically elongate form, arranged for down flow of gas therethrough, with the first catalyst bed at an uppermost position in the successive catalyst beds, overlying the second catalyst bed, which in turn overlies the third catalyst bed, with the third catalyst bed being at a lowermost position in the successive catalyst beds; (12) the successive catalyst beds in the unitary adiabatic reactor are separated from one another by physical separation elements or structure; (13) the feedstock fuel contained in the feedstock fuel source comprising ethanol, and the process controller being configured and arranged to coordinate operation of the electrolyzer and non-autothermal oxidative reforming system so that the non-autothermal oxidative reforming system carries out the reaction $C_2H_5OH+(3-2x)H_2O+xO \rightarrow (6-2x)H_2+2CO_2$, wherein x is specified by any of: $0<x<1.5$; $0.10 \le x \le 1.1$; $0.3 \le x \le 0.9$; $0.3 \le x \le 0.5$; $0.75 \le x \le 0.85$, or wherein x is about 0.4, 0.5, 0.65, 0.80, or 1.0; (14) the electrolyzer is a solid oxide electrolyzer, and the process controller is configured and arranged to coordinate operation of the electrolyzer and non-autothermal oxidative reforming system so that the non-autothermal oxidative reforming system generates excess heat for transfer to the solid oxide electrolyzer so that the solid oxide electrolyzer operates at thermal efficiency greater than 50%; (15) comprising an ethanol refinery that produces ethanol as a fermentation product from a fermentable feedstock, wherein the ethanol refinery is arranged to supply at least part of the feedstock fuel for the non-autothermal oxidative reforming system; (16) the electrolyzer and the non-autothermal oxidative reforming system being arranged to export waste heat to fermentation and distillation apparatus of the ethanol refinery; (17) a $CO_2$ processing or carbon capture system arranged to receive $CO_2$ gas from each of the ethanol refinery and the non-autothermal oxidative reforming system.

In another specific embodiment (referred to hereinafter as "Embodiment II"), the disclosure relates to a hydrogen generation process, comprising operating the thermally integrated hydrogen generation system described immediately above to perform a hydrogen generation process comprising: electrolyzing water to generate hydrogen gas and oxygen gas therefrom; and non-autothermally catalytically oxidatively reforming the feedstock fuel with said oxygen gas and with water from the water source to generate hydrogen.

Embodiment II may be implemented with any one or more of the following features: (1) the bio-derived content of the feedstock fuel being up to 100% by volume of the feedstock fuel, e.g., being in a range in which the lower end point value is 1%, 2%, 3%, 4%, 5%, 8%, 10%, 12%, 15%. 18%, 20%, 25%, 30%, 35%, 40%, 45%, 50%, 55%, 60%, 65%, 70%, 75%, 80%, 85%, 90%, 95%, 98%, or up to 100%, by volume, based on volume of the feedstock fuel, and in which the upper end point value is one of the foregoing numeric values exceeding the lower end point value and up to and including the value of 100% by volume; (2) the feedstock fuel comprising a biologically produced hydrocarbon; (3) the feedstock fuel comprising a biologically produced oxygenate; (4) the feedstock fuel comprising ethanol; (5) the electrolyzing being carried out in an electrolyzer selected from the group consisting of polymer electrolyte membrane electrolyzers, alkaline electrolyzers, and solid oxide electrolyzers; (6) the partial oxidation catalyst in the first catalyst bed comprising a rhodium catalyst, the steam reforming catalyst in the second catalyst bed comprising a promoted nickel catalyst, the high temperature water gas shift catalyst in the third catalyst bed comprising a copper-promoted iron catalyst, and the low temperature water gas shift catalyst in the fourth catalyst bed comprising copper/zinc coated monolith catalyst; (7) the partial oxidation reaction being carried out in the first catalyst bed at temperature in a range of from about 700° C. to about 900° C., steam reforming reaction being carried out in the second catalyst bed at temperature in a range of from about 400° C. to about 850° C., high temperature water gas shift reaction being carried out in the third catalyst bed at temperature in a range of from about 300° C. to about 450° C., and low temperature water gas shift reaction being carried out in the fourth catalyst bed in the low temperature water gas shift reactor at temperature in a range of from about 150° C. to about 350° C.; (8) wherein x is specified by any of: $0<x<1.5$; $0.10 \leq x \leq 1.1$; $0.3 \leq x \leq 0.9$; $0.3 \leq x \leq 0.5$; $0.75 \leq x \leq 0.85$, or wherein x is about 0.4, 0.5, 0.65, 0.80, or 1.0; (9) the hydrogen generated in the non-autothermally catalytically oxidatively reforming being discharged from the unitary adiabatic reactor in a discharged gas stream at a concentration of at least 60 mol %; (10) the non-autothermally catalytically oxidatively reforming being thermally neutral and the electrolyzing providing all oxygen required by the non-autothermally catalytically oxidatively reforming; (11) the electrolyzing being carried out in a solid oxide electrolyzer, wherein the non-autothermally catalytically oxidatively reforming is conducted to generate excess heat, and wherein the excess heat generated by the non-autothermally catalytically oxidatively reforming is transferred to the solid oxide electrolyzer so that the solid oxide electrolyzer operates at thermal efficiency greater than 50%; (12) the throughput of each of the electrolyzer and the non-autothermal oxidative reforming system being adjusted by the process controller in response to variability of the feedstock fuel and variability of electricity costs; (13) producing ethanol as a fermentation product from a fermentable feedstock in an ethanol refinery, and supplying the ethanol from the ethanol refinery as at least part of the feedstock fuel for the non-autothermal oxidative reforming system; (14) the electrolyzer and the non-autothermal oxidative reforming system being arranged to export waste heat to fermentation and distillation apparatus of the ethanol refinery; and (15) treating $CO_2$ gas in a $CO_2$ processing or carbon capture system arranged to receive $CO_2$ gas from each of the ethanol refinery and the non-autothermal oxidative reforming system.

In various other embodiments of the disclosure, any one or more of the features (1)-(17) specified above for Embodiment I and any one or more of the features (1)-(15) specified above for Embodiment II may independently be implemented in the systems and processes of the disclosure, as further embodiments of the disclosure.

Various other additional embodiments of the disclosure are set forth below.

Embodiment 1: A hydrogen production process, comprising: (a) electrolyzing water to generate hydrogen gas and oxygen gas therefrom, the generated hydrogen gas being a first hydrogen component of the hydrogen production; (b) adiabatically and non-autothermally catalytically oxidatively reforming a feedstock comprising at least one of an oxygenate and a hydrocarbon, with water and with high purity oxygen comprising at least a portion of the oxygen gas generated by the electrolyzing, to produce oxidative reforming reaction product gas containing hydrogen, CO, $CO_2$, methane, and steam; (c) catalytically reacting the oxidative reforming reaction product gas in a catalytic water gas shift reaction to convert at least part of the CO in the oxidative reforming reaction product gas to $CO_2$ and hydrogen by reaction with the steam therein, to produce a water gas shift reaction product gas containing hydrogen, methane, CO, and $CO_2$; and (d) separating the water gas shift reaction product gas to recover hydrogen gas therefrom as a second hydrogen component of the hydrogen production.

Embodiment 2: The hydrogen production process of Embodiment 1, wherein the electrolyzing (a) generates from 15% to 60% of the hydrogen production of the hydrogen production process, and all of the high purity oxygen required for adiabatically and non-autothermally catalytically oxidatively reforming the feedstock.

Embodiment 3: The hydrogen production process of Embodiment 1, wherein the separating (d) of the water gas shift reaction product gas to recover hydrogen gas therefrom produces a waste gas containing CO, $CO_2$, methane, and unrecovered hydrogen, the process further comprising: (e) heating the feedstock, water, and oxygen gas of (b) prior to the adiabatically and non-autothermally catalytically oxidatively reforming, by heat produced by combusting the waste gas.

Embodiment 4: The hydrogen production process of Embodiment 1, wherein the adiabatically and non-autothermally catalytically oxidatively reforming is conducted in a unitary non-autothermal adiabatic reactor.

Embodiment 5: The hydrogen production process of Embodiment 4, wherein (c) catalytically reacting the oxidative reforming reaction product gas in a catalytic water gas shift reaction is carried out at least partially in the unitary non-autothermal adiabatic reactor.

Embodiment 6: The hydrogen production process of Embodiment 1, wherein (c) catalytically reacting the oxidative reforming reaction product gas in a catalytic water gas shift reaction comprises a higher temperature catalytic water gas shift reaction producing a higher temperature catalytic water gas shift reaction product gas that then undergoes a subsequent lower temperature catalytic water gas shift reaction to produce the water gas shift reaction product gas.

Embodiment 7: The hydrogen production process of Embodiment 6, wherein the higher temperature catalytic water gas shift reaction product gas prior to undergoing the subsequent lower temperature catalytic water gas shift reaction is heat exchanged with the feedstock and water of (b) for further heating thereof prior to the adiabatically and non-autothermally catalytically oxidatively reforming.

Embodiment 8: The hydrogen production process of Embodiment 1, wherein the feedstock comprises a non-bio-derived feedstock.

Embodiment 9: The hydrogen production process of Embodiment 8, wherein the non-bio-derived feedstock comprises feedstock selected from the group consisting of:

natural gas; $C_2$-$C_{15}$ hydrocarbons; alcohols; and blends of two or more of the foregoing.

Embodiment 10: The hydrogen production process of Embodiment 1, wherein the feedstock comprises a bio-derived feedstock.

Embodiment 11: The hydrogen production process of Embodiment 1, wherein the feedstock comprises at least one of a biologically produced hydrocarbon and a biologically produced oxygenate.

Embodiment 12: The hydrogen production process of Embodiment 1, wherein the feedstock comprises ethanol.

Embodiment 13: The hydrogen production process of Embodiment 1, wherein the feedstock comprises bioethanol.

Embodiment 14: The hydrogen production process of Embodiment 1, wherein the electrolyzing is carried out in an electrolyzer selected from the group consisting of polymer electrolyte membrane electrolyzers, alkaline electrolyzers, and solid oxide electrolyzers.

Embodiment 15: The hydrogen production process of Embodiment 1, wherein the adiabatically and non-autothermally catalytically oxidatively reforming (b) comprises partial oxidation catalytic reaction and subsequent catalytic steam reforming reaction.

Embodiment 16: The hydrogen production process of Embodiment 15, wherein the partial oxidation catalytic reaction is conducted with a rhodium catalyst and the catalytic steam reforming reaction is conducted with a promoted nickel catalyst.

Embodiment 17: The hydrogen production process of Embodiment 1, wherein (c) catalytically reacting the oxidative reforming reaction product gas in a catalytic water gas shift reaction comprises a higher temperature catalytic water gas shift reaction producing a higher temperature catalytic water gas shift reaction product gas that then undergoes a subsequent lower temperature catalytic water gas shift reaction to produce the water gas shift reaction product gas, wherein the higher temperature catalytic water gas shift reaction is conducted with a copper-promoted iron catalyst, and the lower temperature catalytic water gas shift reaction is conducted with a copper/zinc catalyst.

Embodiment 18: The hydrogen production process of Embodiment 15, wherein the partial oxidation catalytic reaction is conducted at temperature in a range of from about 700° C. to about 900° C., and the catalytic steam reforming reaction is conducted at temperature in a range of from about 400° C. to about 850° C.

Embodiment 19: The hydrogen production process of Embodiment 1, wherein (c) catalytically reacting the oxidative reforming reaction product gas in a catalytic water gas shift reaction comprises a higher temperature catalytic water gas shift reaction producing a higher temperature catalytic water gas shift reaction product gas that then undergoes a subsequent lower temperature catalytic water gas shift reaction to produce the water gas shift reaction product gas, wherein the higher temperature catalytic water gas shift reaction is conducted at temperature in a range of from about 300° C. to about 450° C., and the lower temperature catalytic water gas shift reaction is conducted at temperature in a range of from about 150° C. to about 350° C.

Embodiment 20: The hydrogen production process of Embodiment 1, wherein (b) adiabatically and non-autothermally catalytically oxidatively reforming comprises performance of reaction (1):

$$C_2H_5OH + (3-2x)H_2O + xO_2 \rightarrow (6-2x)H_2 + 2CO_2 \quad (1)$$

wherein $0 < x < 1.5$.

Embodiment 21: The hydrogen production process of Embodiment 20, wherein the reforming (b) is conducted at a molar ratio of steam to ethanol in a range of from 0 to 6, and a molar ratio of oxygen to ethanol in a range of from 0.1 to 1.

Embodiment 22: The hydrogen production process of Embodiment 1, wherein the adiabatically and non-autothermally catalytically oxidatively reforming (b) is thermally neutral and the electrolyzing provides all oxygen required by the reforming.

Embodiment 23: The hydrogen production process of Embodiment 1, wherein the electrolyzing is carried out in a solid oxide electrolyzer, wherein the adiabatically and non-autothermally catalytically oxidatively reforming (b) is conducted to generate excess heat, and wherein the excess heat generated by the non-autothermally catalytically oxidatively reforming (b) is transferred to the solid oxide electrolyzer so that the solid oxide electrolyzer operates at thermal efficiency greater than 50%.

Embodiment 24: The hydrogen production process of Embodiment 1, wherein at least part of the feedstock is supplied by an ethanol refinery producing ethanol as a fermentation product from a fermentable feedstock.

Embodiment 25: The hydrogen production process of Embodiment 24, wherein $CO_2$ produced by the ethanol refinery and $CO_2$ produced by the hydrogen production process are treated in a $CO_2$ processing or carbon capture system arranged to receive $CO_2$ gas from each of the ethanol refinery and the hydrogen production process.

Embodiment 26: The hydrogen production process of Embodiment 24, wherein waste heat of the hydrogen production process is exported to fermentation and distillation apparatus of the ethanol refinery.

Embodiment 27: The hydrogen production process of Embodiment 1, wherein the feedstock comprises methane, and (b) adiabatically and non-autothermally catalytically oxidatively reforming comprises performance of reaction (2):

$$2CH_4 + xO_2 + (4-2x)H_2O = (8-2x)H_2 + 2CO_2 \quad (2)$$

wherein x is in a range of from 0.5 to 2.0, and
wherein (b) adiabatically and non-autothermally catalytically oxidatively reforming operation is thermally neutral at $x=0.7$.

Embodiment 28: The hydrogen production process of Embodiment 1, wherein the feedstock comprises methanol, and (b) adiabatically and non-autothermally catalytically oxidatively reforming comprises performance of reaction (3):

$$CH_3OH + xO_2 + (1-2x)H_2O = (3-2x)H_2 + CO_2 \quad (3)$$

wherein x is in a range of from 0.1 to 0.5, and
wherein (b) adiabatically and non-autothermally catalytically oxidatively reforming operation is thermally neutral at $x=0.15$.

Embodiment 29: The hydrogen production process of Embodiment 1, wherein the feedstock comprises one or more hydrocarbons, and (b) adiabatically and non-autothermally catalytically oxidatively reforming comprises performance of reaction (4):

$$C_nH_m + xO_2 + (2n-2x)H_2O = (2n-2x+m/2)H_2 + nCO_2 \quad (4)$$

wherein x is in a range of from 0.4 to 14, for values of n=2-15, and m is a number compatible with n for each of said one or more hydrocarbons.

Embodiment 30: The hydrogen production process of Embodiment 1, wherein the feedstock comprises glycerol, and (b) adiabatically and non-autothermally catalytically oxidatively reforming comprises performance of reaction (5):

$$C_3H_8O_3 + xO_2 + (3-2x)H_2O = (7-2x)H_2 + 3CO_2 \quad (5)$$

wherein x is in a range of from 0.2 to 1.2.

A listing of drawing reference numerals for the drawings of the present disclosure is set out below.

10 hydrogen gas generation system
11 non-autothermal oxidative reforming system
12 non-autothermal oxidative reforming system
14 low temperature electrolysis system
16 water-ethanol supply line
18 feedstock blender
20 heat exchanger
22 feedstock delivery line
24 heat exchanger
26 flue gas line
28 non-autothermal oxidative reforming reactor
30 non-autothermal oxidative reforming reactor discharge line
32 burner
33 burner oxygen/air feed line
34 low temperature water gas shift reactor
36 low temperature water gas shift reactor discharge line
38 hydrogen gas purifier
40 hydrogen gas discharge line
42 waste gas discharge line
44 oxygen feed line
46 carbon dioxide recovery vessel
48 carbon dioxide discharge line
49 recycle water discharge line
50 feed water source
52 feed water pump
54 water filter/purifier
56 oxygen-water phase separation and supply vessel
58 water feed line
60 water circulation pump
62 heat exchanger
64 ion exchanger
66 PEM electrolyzer
68 oxygen discharge line
70 oxygen demister vessel
72 oxygen discharge line
73 oxygen storage vessel
74 flow control valve
76 hydrogen outlet line
78 gas-liquid separator vessel
80 hydrogen delivery line
82 hydrogen demister vessel
84 heat exchanger
86 condensate trap
88 flow control valve
90 hydrogen gas storage reservoir
92 hydrogen compressor
94 hydrogen discharge line
96 hydrogen supply line
98 flow control valve
100 hydrogen gas generation system
102 high temperature solid oxide electrolyzer
104 hydrogen/steam discharge line
106 oxygen/steam discharge line
108 heat exchanger
110 makeup water supply line
112 heat exchanger
114 oxygen/water separator
116 heat exchanger
118 heat exchanger
120 thermal recovery assembly
122 knock-out pot
124 hydrogen discharge line
126 high temperature electrolysis system
128 electrolyzer recycle line
130 flow control valve
132 process controller
134 bidirectional signal transmission line
136 bidirectional signal transmission line
140 process controller
142 bidirectional signal transmission line
144 bidirectional signal transmission line While the disclosure has been set forth herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the disclosure as hereinafter claimed is intended to be broadly construed and interpreted, as including all such variations, modifications and alternative embodiments, within its spirit and scope.

What is claimed is:

1. A process for production of syngas and hydrogen, comprising:
    (a) electrolyzing water to generate hydrogen gas and oxygen; and
    (b) adiabatically and non-autothermally catalytically oxidatively reforming methane in a feed gas comprising as reactants (i) oxygen that is at least partially comprised by the oxygen generated from the electrolyzing, (ii) water, (iii) CO$_2$, and (iv) said methane, to produce a product gas comprising syngas,
    wherein the adiabatically and non-autothermally catalytically oxidatively reforming is conducted in a unitary adiabatic non-autothermal oxidative reforming reactor containing therein a partial oxidation catalyst in a partial oxidation zone and a reforming catalyst in a reforming zone, arranged so that the feed gas when introduced into the unitary adiabatic non-autothermal oxidative reforming reactor is contacted with the partial oxidation catalyst in the partial oxidation zone to carry out an exothermic partial oxidation reaction of the feed gas and reacted gas from the exothermic partial oxidation reaction thereafter is contacted with the reforming catalyst in the reforming zone to carry out an endothermic reforming reaction producing the product gas comprising syngas, with the product gas comprising syngas being discharged from the unitary adiabatic non-autothermal oxidative reforming reactor,
    wherein the adiabatically and non-autothermally catalytically oxidatively reforming is conducted in the unitary adiabatic non-autothermal oxidative reforming reactor so that no external heat other than preheating of the reactants of the feed gas is required to sustain the exothermic partial oxidation reaction and the endothermic reforming reaction in the unitary adiabatic non-autothermal oxidative reforming reactor,
    wherein the product gas comprising syngas discharged from the the unitary adiabatic non- autothermal oxidative reforming reactor is heat exchanged with the water and methane reactants of the feed gas prior to their mixing with the oxygen reactant to form the feed gas,
    wherein a waste gas containing CO, CO$_2$, methane, and residual hydrogen is recovered from the product gas comprising syngas, and combusted to produce flue gas that is heat exchanged with the feed gas to preheat the feed gas prior to the feed gas being introduced into the unitary adiabatic non-autothermal oxidative reforming reactor.

2. The process of claim 1, wherein the feed gas comprises natural gas comprising said methane.

3. The process of claim 1, wherein the partial oxidation catalyst comprises a pyrochlore catalyst.

4. The process of claim 1, wherein the reforming catalyst comprises a nickel-based catalyst.

5. The process of claim 1, wherein the partial oxidation catalyst comprises a pyrochlore catalyst, and the reforming catalyst comprises a nickel-based catalyst.

6. The process of claim 1, wherein said reforming comprises at least one of the reactions of:

$2CH_4+O_2+CO_2=3H_2+3CO+H_2O$;

and $4CH_4+O_2+CO_2+H_2O=9H_2+5CO$.

7. The process of claim 1, wherein in the product gas, ($H_2$ vol %−$CO_2$ vol %)/(CO vol %+$CO_2$ vol %)≥1.0.

8. The process of claim 1, wherein the waste gas is combusted in the presence of oxygen generated by the electrolyzing step.

9. The process of claim 1, wherein heat is transferred from the product gas to the electrolyzing step.

10. The process of claim 1, further comprising recovery of hydrogen from the product gas.

11. The process of claim 1, wherein the exothermic partial oxidation reaction of the feed gas is carried out at temperature in a range of 700-900° C., and wherein the endothermic reforming reaction is carried out at temperature in a range of 400-850° C.

12. The process of claim 1, wherein the electrolyzing is conducted in a polymer electrolyte membrane electrolyzer.

13. The process of claim 1, wherein the electrolyzing is conducted in an alkaline electrolyzer.

14. The process of claim 1, wherein the electrolyzing is conducted in a solid oxide electrolyzer.

15. The process of claim 1, wherein the reforming generates heat that is transferred to the electrolyzing step.

16. The process of claim 1, wherein said methane comprises biomethane.

17. The process of claim 1, wherein the reforming is conducted with a catalyst comprising one or more metal(s) selected from Group VIII of the Periodic Table.

18. The process of claim 1, wherein the reforming is conducted with a catalyst comprising one or more metal(s) selected from the group consisting of aluminum, zirconium, strontium, nickel, lanthanum, calcium, magnesium, gadolinium, yttrium, cobalt, cerium, ruthenium, platinum, rhodium, tungsten, palladium, molybdenum, manganese, copper, tin, rhodium, and vanadium.

19. The process of claim 1, wherein the reforming is conducted with a catalyst comprising noble metal, mixed metal oxide, perovskite, hexaaluminate, or pyrochlore.

20. The process of claim 1, wherein the electrolyzing produces 25% to 50% of total hydrogen produced by the electrolyzing and reforming.

21. The process of claim 1, wherein the partial oxidation catalyst comprises rhodium, palladium, platinum, ruthenium, lanthanum, zirconium, strontium, calcium, yttrium, cerium, nickel, cobalt, or mixed metal oxide, or combinations or mixtures of metals and/or metal oxides.

22. The process of claim 1, wherein the partial oxidation catalyst comprises rhodium.

23. The process of claim 1, wherein the partial oxidation catalyst comprises rhodium-substituted pyrochlore catalyst.

24. The process of claim 1, wherein the steam reforming catalyst comprises nickel, ruthenium, rhodium, copper, zinc, cobalt, or mixed metal oxide, or combinations or mixtures of metals and/or metal oxides.

25. The process of claim 1, wherein the endothermic reforming reaction is conducted with a promoted nickel catalyst.

26. The process of claim 25, wherein the promoted nickel catalyst comprises a promoter selected from the group consisting of potassium, magnesium, strontium, and calcium.

27. The process of claim 1, wherein the exothermic partial oxidation reaction is conducted with a catalyst comprising rhodium-substituted pyrochlore catalyst, and the endothermic reforming reaction is conducted with a promoted nickel catalyst.

28. The process of claim 1, wherein the process is conducted in a modular hydrogen generation system.

29. The process of claim 1, in which the electrolyzing produces 15% to 60% of total hydrogen produced by the electrolyzing and reforming.

30. The process of claim 1, wherein the electrolyzing is a primary source for the oxygen in the feed gas, and a supplemental oxygen source is employed to supply oxygen for the feed gas.

* * * * *